(12) United States Patent
Shao et al.

(10) Patent No.: US 12,522,590 B2
(45) Date of Patent: Jan. 13, 2026

(54) BREFELDIN A DERIVATIVES, PREPARATION METHOD AND USE THEREOF

(71) Applicant: OCEAN UNIVERSITY OF CHINA, Shandong (CN)

(72) Inventors: Changlun Shao, Shandong (CN); Changyun Wang, Shandong (CN); Yaoyao Jiang, Shandong (CN)

(73) Assignee: OCEAN UNIVERSITY OF CHINA, Shandong (CN)

( * ) Notice: Subject to any disclaimer, the term of this patent is extended or adjusted under 35 U.S.C. 154(b) by 1078 days.

(21) Appl. No.: 17/467,821

(22) Filed: Sep. 7, 2021

(65) Prior Publication Data

US 2021/0403458 A1  Dec. 30, 2021

Related U.S. Application Data

(63) Continuation-in-part of application No. PCT/CN2020/140203, filed on Dec. 28, 2020.

(30) Foreign Application Priority Data

Nov. 28, 2019 (CN) .......................... 201911189088.5
Nov. 24, 2020 (CN) .......................... 202011327850.4

(51) Int. Cl.
*C07D 405/12* (2006.01)
*A61P 35/00* (2006.01)

(52) U.S. Cl.
CPC ............ *C07D 405/12* (2013.01); *A61P 35/00* (2018.01)

(58) Field of Classification Search
CPC ........ C07D 405/12; A61P 35/00; A61P 35/02; A61K 31/381; A61K 31/4427; A61K 31/4709; A61K 31/4725
See application file for complete search history.

(56) References Cited

U.S. PATENT DOCUMENTS

2013/0245047 A1* 9/2013 Sonis ................. A61K 31/4458
514/263.36

FOREIGN PATENT DOCUMENTS

| CN | 103772342 A | 5/2014 | |
|---|---|---|---|
| CN | 103788053 A | 5/2014 | |
| CN | 103772342 B * | 5/2015 | ........... C07D 313/00 |
| CN | 105153136 A | 12/2015 | |
| WO | 99/31084 A1 | 6/1999 | |
| WO | 2014/057436 A2 | 4/2014 | |

OTHER PUBLICATIONS

Anadu, N.O. et al. Synthesis and anticancer activity of brefeldin A ester derivatives. J Med Chem, 2006. vol. 49(13): 3897-3905. (Year: 2006).*
Patani, G. A. et al. Bioisosterism: A Rational Approach in Drug Design. Chemical reviews, 1996. vol. 96, 8: 3147-3176. (Year: 1996).*
CAS Registry No. 1609540-52-4 (Entered STN on Jun. 4, 2014). (Year: 2014).*
International Search Report of PCT/CN2020/140203, mailed on Mar. 26, 2021.

* cited by examiner

*Primary Examiner* — Jean P Cornet
*Assistant Examiner* — Chihyi Lee
(74) *Attorney, Agent, or Firm* — LEASON ELLIS LLP

(57) ABSTRACT

The present disclosure relates to the field of medicinal chemistry, and specifically to brefeldin A derivatives represent by Formula (I) and its use in the inhibition of tumor proliferation activity. The new compounds provided herein are prominent in the prevention or treatment of hyperproliferative diseases, including liver cancer, leukemia, breast cancer, colon adenocarcinoma, lung cancer, Bart's esophageal cancer, gastric cancer, cervical cancer, pancreatic cancer, kidney cancer, endometrial cancer, nasopharyngeal cancer, bone cancer, lymphoma, brain cancer, nerve cancer, oral cancer and colorectal cancer, and have the potential to be developed as novel antitumor agents.

18 Claims, No Drawings

Specification includes a Sequence Listing.

BREFELDIN A DERIVATIVES, PREPARATION METHOD AND USE THEREOF

CROSS-REFERENCE TO RELATED APPLICATIONS

The present application is a continuation-in-part application based on International Patent Application No. PCT/CN2020/140203, which claims priorities to Chinese Patent Application No. 201911189088.5, filed on Nov. 28, 2019 and entitled "Brefeldin A Derivatives, Preparation Method and Use thereof" as well as Chinese Patent Application No. 202011327850.4, filed on Nov. 24, 2020 and entitled "Brefeldin A Derivatives, Preparation Method and Use thereof", all of which are incorporated herein by reference in their entireties.

TECHNICAL FIELD

The present disclosure belongs to the field of pharmaceutical technology, and specifically relates to a class of brefeldin A derivatives, compositions, preparation methods and uses thereof, wherein the compound or composition has the use of inhibiting tumor proliferation activity and can be used to prevent or treat hyperproliferative diseases.

BACKGROUND ART

Brefeldin A (BFA), a kind of macrolide fungal metabolite, was isolated from *Penicillium decumbens* in 1958 by Singleton et al. (Singleton, V. L. et al., *Nature*, 1958, 181, 1072-1073). Its absolute configuration was determined in 1971 by Weber et al. (Weber, H. P. et al., *Helv. Chim. Acta.*, 1971, 54, 2763-2766) by single crystal, CD, and asymmetric synthesis.

BFA is not ideal due to its own pharmacokinetic properties (low bioavailability, poor water solubility, low plasma exposure, short plasma half-life and high toxicity) and cannot be used as a drug in clinical applications. Hitherto, there have been no reports for the BFA derivatives with effectively improved pharmacokinetic properties, increased solubility and/or reduced toxicity.

SUMMARY OF THE DISCLOSURE

The following only summarizes some aspects of the present disclosure, and is not limited there. These aspects and other parts are explained more fully later. All references in this specification are hereby cited in their entirety. When there is a discrepancy between the disclosure content of this specification and the cited documents, the disclosure content of this specification shall prevail.

The present disclosure provides a new class of BFA derivatives for the prevention or treatment of hyperproliferative diseases, such as liver cancer, leukemia, breast cancer, colon adenocarcinoma, lung cancer, Bart's esophageal cancer, gastric cancer, cervical cancer, pancreatic cancer, kidney cancer, endometrial cancer, nasopharyngeal cancer, bone cancer, lymphoma, brain cancer, nerve cancer, oral cancer and colorectal cancer. The compounds of the present disclosure have stable properties and good safety, which can greatly increase the content of BFA in mammals (increase plasma $C_{max}$ and plasma exposure), and can greatly ameliorate the problem of unsatisfactory in vivo efficacy caused by the unsatisfactory pharmacokinetic properties of BFA, which thereby possess a good clinical application prospect.

The present disclosure also provides methods for preparing said compounds, pharmaceutical compositions comprising said compounds, and methods for using said compounds or compositions to treat the above-mentioned diseases in mammals, especially in humans.

Specifically,

In one aspect, the present disclosure relates to a compound represented by Formula (I), or a stereoisomer, a tautomer, a nitrogen oxide, a solvate, a metabolite, an ester or a pharmaceutical acceptable salt of the compound, or a prodrug thereof,

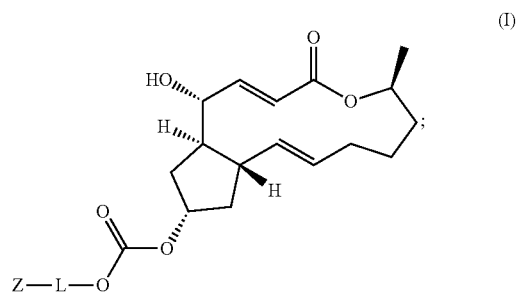

wherein Z is selected from the group consisting of optionally substituted pyridine ring, quinoline ring, and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, $C_{1-3}$ alkyl, $C_{1-3}$ haloalkyl, $C_{1-3}$ haloalkoxy, $C_{1-3}$ alkoxy, $C_{3-6}$ cycloalkyl, three to six-membered heterocyclyl, aryl and five to six-membered heteroaryl;

and L is a single bond or —$C_{1-6}$— alkylene.

In some embodiments, Z is an optionally substituted pyridine ring, quinoline ring and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, methyl, ethyl, n-propyl, isopropyl, difluoromethyl, trifluoromethyl, methoxyl, trifluoromethoxy, ethyoxyl, isopropoxy, cyclopropyl, cyclobutyl, cyclopentyl, cyclohexyl, pyrrolidinyl, pyrazolyl, piperidyl, piperazinyl, tetrahydropyranyl, thiomorpholinyl, phenyl, morpholinyl, thiazolyl, oxazolyl, pyridyl and pyrimidinyl.

In some embodiments, L is a single bond, methylene, ethylidene, propylidene or butylidene.

Optionally, the stereoisomer of the compound represented by Formula (I) comprises a geometric isomer of the compound represented by Formula (I).

Optionally, the solvate of the compound represented by Formula (I) comprises a hydrate of the compound represented by Formula (I).

In another aspect, the present disclosure relates to a pharmaceutical composition comprising the compounds disclosed herein.

In some embodiments, the pharmaceutical compositions described in the present disclosure further comprise a pharmaceutically acceptable excipient, adjuvant, carrier, solvent or a combination thereof.

Optionally, the excipient is selected from a diluent, a filler, a binder, disintegrant, a lubricant, a glidant, a granulating agent, a coating agent, a wetting agent, a solvent, a co-solvent, a suspending agent, a emulsifier, a sweetener, a corrigent, a taste masking agent, a colorant, an anti-caking agent, a humectant, a chelating agent, a plasticizer, a tackifier, an antioxidant, a preservative, a stabilizer, a surfactant or a buffer.

Optionally, the carrier is selected from a disintegrant, a controlled-release polymer, a lubricant, a diluent or a colorant.

In another aspect, the present disclosure relates to a method for treatment of hyperproliferative diseases in mammals, comprising administering an effective amount of the compound or the pharmaceutical composition in the disclosure to the mammals.

Optionally, the mammals comprise humans.

Optionally, the hyperproliferative diseases are selected from the group consisting of liver cancer, leukemia, breast cancer, colon adenocarcinoma, lung cancer, Bart's esophageal cancer, gastric cancer, cervical cancer, pancreatic cancer, kidney cancer, endometrial cancer, nasopharyngeal cancer, bone cancer, lymphoma, brain cancer, nerve cancer, oral cancer and colorectal cancer.

In another aspect, the present disclosure relates to methods for the preparation, isolation and purification of the compounds comprised in Formula (I).

In one aspect, the present disclosure provides a method for preparing the compound represented by Formula (I),

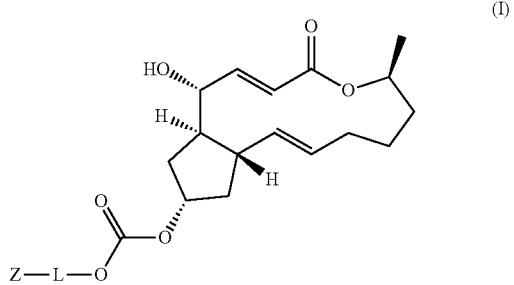

(I)

wherein a compound represented by Formula (I-1) reacts with phosgene or bi- or tri-phosgene and a compound represented by Formula (I-3) in an organic solvent in the presence of a base to give the compound represented by Formula (I),

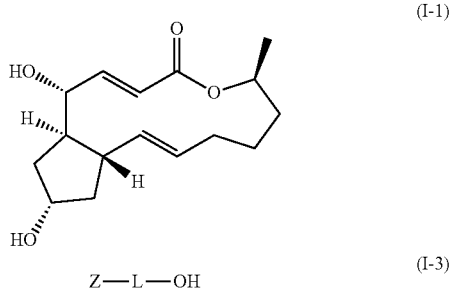

(I-1)

(I-3)

wherein the solvent is acetone or tetrahydrofuran, and the base is selected from N,N-dimethyl-4-pyridine, triethylamine, pyridine, diisopropylethylamine or dimethylformamide;

wherein Z is selected from the group consisting of optionally substituted pyridine ring, quinoline ring, and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, $C_{1-3}$ alkyl, $C_{1-3}$ haloalkyl, $C_{1-3}$ haloalkoxy, $C_{1-3}$ alkoxy, $C_{3-6}$ cycloalkyl, three to six-membered heterocyclyl, aryl and five to six-membered heteroaryl;

and L is a single bond or —$C_{1-6}$— alkylene.

In some embodiments, Z is selected from the group consisting of optionally substituted pyridine ring, quinoline ring and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, methyl, ethyl, n-propyl, isopropyl, difluoromethyl, trifluoromethyl, methoxyl, trifluoromethoxy, ethyoxyl, isopropoxy, cyclopropyl, cyclobutyl, cyclopentyl, cyclohexyl, pyrrolidinyl, pyrazolyl, piperidyl, piperazinyl, tetrahydropyranyl, thiomorpholinyl, phenyl, morpholinyl, thiazolyl, oxazolyl, pyridyl and pyrimidinyl;

and L is selected from single bond, methylene, ethylidene, propylidene or butylidene.

The biological test results show that the compounds in the present disclosure can inhibit tumor proliferation.

Any embodiment of any aspect of the present disclosure can be combined with other embodiments as long as they do not appear contradictory. In addition, in any embodiment of any aspect of the present disclosure, any technical feature can be applied to the technical feature in other embodiments, as long as they do not appear contradictory.

The foregoing description merely summarizes certain aspects of the disclosure, but is not limited to these aspects. These and other aspects will be described in more detail below.

DETAILED DESCRIPTION OF EMBODIMENTS

Definitions and General Terms

Some embodiments disclosed herein will now be described in detail, examples of which are illustrated by the accompanying structural and chemical formulas. The disclosure is intended to cover all alternative, modified and equivalent technical solutions, all of which are included within the scope disclosed herein as defined by the claims. One skilled in the art will recognize that many methods and materials similar or equivalent to those described herein can be used in the practice disclosed herein. Disclosed herein is in no way limited to the methods and materials. In the event that one or more of the incorporated literature, patents and similar materials differ from or contradict this application (including but not limited to the term definition, term usage and/or described techniques, and the like), the present application shall prevail.

It should be further recognized that certain features disclosed herein have been described in multiple independent embodiments for clarity, but may also be provided in combination in a single embodiment. On the contrary, various features disclosed herein have been described in a single embodiment for the sake of brevity, but can also be provided individually or in any suitable sub combination.

Unless otherwise stated, all technical terms used in the present disclosure have the same meanings as those of the skilled in the art to which the disclosure belongs. All patents and public publications involved in the disclosure are incorporated into the present disclosure as a whole by reference.

Unless otherwise stated, the following definitions used in the present application should be used. For purposes of the present disclosure, the chemical elements are identified in accordance with the Periodic Table of the Elements, CAS version and *the Handbook of Chemistry and Physics, 75th* Ed. 1994. Additionally, general principles of organic chemistry are described in "*Organic Chemistry*", Thomas Sorrell, University Science Books, Sausalito: 1999, and "*March's Advanced Organic Chemistry*" by Michael B. Smith and Jerry March, John Wiley & Sons, New York: 2007, all of which are incorporated herein by reference in their entireties.

As described herein, compounds may be optionally substituted with one or more substituents, such as those illustrated above, or as exemplified by particular classes, subclasses and species disclosed herein. It will be appreciated that the term "optionally substituted" is used interchangeably with the term "substituted or unsubstituted". In general, the term "substituted" whether preceded by the term "optionally" or not, refers to the replacement of one or more hydrogen radicals in a given structure with the radical of a specific substituent. Unless otherwise indicated, an optionally substituted group may have a substituent at each substitutable position of the group. When more than one position in a given structure may be substituted with more than one substituent selected from a specific group, the substituent may be either the same or different at each position, wherein the substituents may be, but are not limited to, haloalkyl, hydroxyl, halo, cyano, aryl, alkyl, alkenyl, alkynyl, heteroaryl, alkylamino, alkylthio, alkoxy, heterocyclyl, thiol, nitro, amino, aryloxy, heteroaryloxy, oxo(=O), carboxy, hydroxyl-substituted alkoxy, hydroxyl-substituted alkyl-C(=O)—, alkyl-C(=O)—, alkyl-S(=O)—, alkyl-S(=O)$_2$—, hydroxyl-substituted alkyl-S(=O)—, hydroxyl-substituted alkyl-S(=O)$_2$— and/or carboxyl alkoxy, and the like.

In addition, it should be noted that unless it is explicitly indicated in other ways, the description approaches "each . . . independently"and" . . . each independently "and" . . . independently" adopted herein are interchangeable, which should be understood in a broad concept. It can mean that in different groups, the specific options expressed by the same symbols do not affect each other. It can also indicate that in the same group, the specific options expressed by the same symbols do not affect each other.

The term "subject" used refers to animals. The animal is typically a mammal. Subjects, for example, also refer to primates (such as human, male or female), bovines, sheep, goats, horses, dogs, cats, rabbits, rats, mice, fish, birds, and the like. In some embodiments, the subject is primate. In other embodiments, the subject is human.

The term "patient" as used herein refers to human beings (including adults and children) or other animals. In some embodiments, "patient" refers to human.

The term "stereoisomer" refers to compounds with the same chemical structure but different arrangement of atoms or groups in space. The compounds disclosed herein can contain asymmetric centers or chiral centers, so there are different stereoisomers. All stereoisomeric forms of compounds disclosed herein, including but not limited to enantiomers, diastereomers, conformational isomers (rotational isomers), geometric isomers (cis/trans) isomers, rotation-hindered isomers and mixtures thereof, such as racemic mixtures, form a part of the disclosure.

The term "chirality" refers to a molecule which cannot overlap with its mirror image; the term "non-chirality" refers to a molecule that can overlap with its mirror image.

The term "comprising" used herein is an open expression, which includes the contents specific in the present disclosure, but does not exclude other aspects.

The term "enantiomer" refers to two isomers of a compound that cannot overlap but mirror each other.

The term "diastereomers" refers to stereoisomers with two or more chiral centers and their molecules are not mirror images of each other. Diastereomers have different physical properties, such as melting point, boiling point, spectral properties and reactivity. Diastereomeric mixtures can be separated by high-resolution analytical operations such as electrophoresis and chromatography, e.g., HPLC.

Many organic compounds exist in the form of optical activity, i.e., they have the ability to rotate the plane of plane-polarized light. When describing optically active compounds, the prefixes D and L or R and S are used to express the absolute configuration of molecules with respect to one or more chiral centers. The prefixes d and l or (+) and (−) are symbols used to specify the rotation of planar polarized light caused by a compound, where (−) or l denotes that the compound is left-handed. Compounds prefixed with (+) or d are dextral. A specific stereoisomer is an enantiomer, and the mixture of these isomers is called an enantiomer mixture. The 50:50 mixture of enantiomers is called racemic mixture or racemic, which can occur when there is no stereoselectivity or stereospecificity in the process of chemical reaction.

Depending on the choice of starting materials and methods, the compounds disclosed herein may exist in the form of one of possible isomers or a mixture thereof, such as a mixture of racemates and diastereomers, depending on the number of asymmetric carbon atoms. Optically active (R)- or (S)-isomers can be prepared using chiral synthons or chiral reagents, or resolved using conventional techniques. If the compound contains a double bond, the substituent may be in E or Z configuration. If the compound contains disubstituted naphthenic groups, the substituents of naphthenic groups may have cis or trans configuration.

The mixture of any stereoisomers can be separated into pure or substantially pure geometric isomers, enantiomers and/or diastereomers, for example, by chromatography and/or fractional crystallization, depending on the differences in the physicochemical properties of the components.

Any asymmetric atom (e.g., carbon, and the like) of the compounds disclosed herein can exist in racemic or enantiomeric enriched forms, such as (R)-, (S)- or (R,S)-configurations. In some embodiments, each asymmetric atom has at least 50% enantiomeric excess, at least 60% enantiomeric excess, at least 70% enantiomeric excess, at least 80% enantiomeric excess, at least 90% enantiomeric excess, at least 95% enantiomeric excess, or at least 99% enantiomeric excess in (R)- or (S)-configuration.

The stereochemistry definitions and rules used herein generally follow S. P. Parker, Ed., McGraw Hill *Dictionary of chemical terms* (1984) McGraw Hill Book Company, New York; and Eliel, E. and Wilen, S., "*Stereochemistry of Organic Compounds*", John Wiley & Sons, Inc., New York, 1994.

The raceme of any end product or intermediate obtained can be separated into optical enantiomers by known methods, such as separation of its diastereomeric salts. Racemic products can be also separated by chiral chromatography, such as high performance liquid chromatography (HPLC) using chiral adsorbents. In particular, enantiomers can be prepared by asymmetric synthesis, for example, with reference to Jacques, et al., Enantiomers, Racemates and Resolutions (Wiley Interscience, New York, 1981); Principles of Asymmetric Synthesis (2$^{nd}$ Ed. Robert E. Gawley, Jeffrey Aubé, Elsevier, Oxford, U K, 2012); Eliel, E. L. Stereochemistry of Carbon Compounds (McGraw-Hill, N Y, 1962); Wilen, S. H. Tables of Resolving Agents and Optical Resolutions p. 268 (E. L. Eliel, Ed., Univ. of Notre Dame Press, Notre Dame, IN 1972); Chiral Separation Techniques: A Practical Approach (Subramanian, G. Ed., Wiley-VCH Verlag GmbH & Co. KGaA, Weinheim, Germany, 2007).

The articles "one", "one (species)" and "the" used herein are intended to include "at least one" or "one or more", unless otherwise stated or in conflict with the context. Therefore, the articles used herein refer to articles with one or more objects. For example, "one component" refers to one or more components, that is, more than one component may be considered for adoption or use in the embodiment of the implementation.

In each part of the disclosure, the substituents of the compounds disclosed herein are disclosed according to the type or range of groups. In particular, the disclosure includes each independent secondary combination of each member of these group types and ranges. For example, the term "$C_{1-3}$ alkyl" specifically refers to the separately disclosed methyl, ethyl and $C_3$ alkyl groups.

Connecting substituents is described in various parts of the disclosure. When the structure clearly needs the connecting group, the listed Markush variables for the group should be understood as the connecting group. For example, if the structure requires a connecting group and "alkyl" or "aryl" is listed for the definition of Markush group of the variable, it should be appreciated that the "alkyl" or "aryl" represents the connected alkylidene group or arylidene group, respectively.

The term "alkyl" refers to a saturated linear or branched-chain monovalent hydrocarbon radical of 1-20 carbon atoms, 1-10 carbon atoms, 1-6 carbon atoms, 1-4 carbon atoms, or 1-3 carbon atoms, wherein the alkyl radical may be optionally substituted independently with one or more substituents described below. Further examples of alkyl groups comprise, but are not limited to methyl (Me, —CH$_3$), ethyl (Et, —CH$_2$CH$_3$), n-propyl (n-Pr, —CH$_2$CH$_2$CH$_3$), i-propyl (i-Pr, CH(CH$_3$)$_2$), n-butyl (n-Bu, —CH$_2$CH$_2$CH$_2$CH$_3$), i-butyl (i-Bu, —CH$_2$CH(CH$_3$)$_2$), s-butyl (s-Bu, —CH(CH$_3$)CH$_2$CH$_3$), t-butyl (t-Bu, —C(CH$_3$)$_3$), n-pentyl (—CH$_2$CH$_2$CH$_2$CH$_2$CH$_3$), 2-pentyl (—CH(CH$_3$) CH$_2$CH$_2$CH$_3$), 3-pentyl (—CH(CH$_2$CH$_3$)$_2$, 2-methyl-2-butyl (—C(CH$_3$)$_2$CH$_2$CH$_3$), 3-methyl-2-butyl- CH(CH$_3$)CH(CH$_3$)$_2$), 3-methyl-1-butyl (—CH$_2$CH$_2$CH (CH$_3$)$_2$), 2-methyl-1-butyl (—CH$_2$CH(CH$_3$)CH$_2$CH$_3$), 1-hexyl (—CH$_2$CH$_2$CH$_2$CH$_2$CH$_2$CH$_3$), 2-hexyl (—CH (CH$_3$)CH$_2$CH$_2$CH$_2$CH$_3$), 3-hexyl (—CH(CH$_2$CH$_3$ (CH$_2$CH$_2$CH$_3$)), 2-methyl-2-pentyl (—C(CH$_3$)$_2$ CH$_2$CH$_2$CH$_3$), 3-methyl-2-pentyl (—CH(CH$_3$)CH(CH$_3$) CH$_2$CH$_3$), 4-methyl-2-pentyl (—CH(CH$_3$)CH$_2$CH(CH$_3$)$_2$), 3-methyl-3-pentyl (—C(CH$_3$)(CH$_2$CH$_3$)$_2$), 2-methyl-3-pentyl (—CH(CH$_2$CH$_3$)CH(CH$_3$)$_2$), 2,3-dimethyl-2-butyl (—C (CH$_3$)$_2$CH(CH$_3$)$_2$), 3,3-dimethyl-2-buty (—CH(CH$_3$)C (CH$_3$)$_3$), n-heptyl, n-octyl, and the like. The terms "alkyl" and the prefix "alk-" are inclusive of both straight chain and branched saturated carbon chain.

The term "alkylene" refers to a saturated divalent alkyl group obtained by removing two hydrogen atoms from a saturated straight or branched hydrocarbon. Unless otherwise specified in detail, the alkylene group contains 1 to 12 carbon atoms. In one embodiment, the alkylene group contains 1 to 6 carbon atoms. In another embodiment, the alkylene group contains 1 to 4 carbon atoms. In another embodiment, the alkylene group contains 1 to 3 carbon atoms. In another embodiment, the alkylene group contains 1 to 2 carbon atoms. Examples include methylene(—CH$_2$—), ethylidene (—CH$_2$CH$_2$—), isopropylidene (—CH (CH$_3$)CH$_2$—), and the like.

The term "haloalkyl" refers to the case where an alkyl group is replaced by one or more halogen atoms, examples of which include, but are not limited to, difluoromethyl, trifluoromethyl, 2,2,3,3-tetrafluoropropyl, and the like.

The term "cycloalkyl" refers to monovalent or multivalent saturated mono- and bicyclic or tricyclic cyclic alkyl groups containing 3 to 12 carbon atoms. In some embodiments, the cycloalkyl comprises 7 to 12 carbon atoms. In some embodiments, the cycloalkyl comprises 3 to 8 carbon atoms. In some embodiments, the cycloalkyl comprises 3 to 6 carbon atoms. The cycloalkyl may be independently unsubstituted or substituted by one or more substituents described in the present disclosure. The substituents may be, but are not limited to, hydroxy, halogen, cyano, aryl, heteroaryl, alkoxy, alkylamino, alkyl, haloalkyl, alkenyl, alkynyl, heterocyclyl, thiol, nitro, amino, aryloxy, hydroxy-substituted alkoxy, hydroxy-substituted alkyl-C(=O)—, alkyl-C(=O)—, alkyl-S(=O), alkyl-S(=O)$_2$—, hydroxy-substituted alkyl-S(=O), hydroxy-substituted alkyl-S(=O)$_2$—, carboxyalkoxy, and the like.

The term "heterocyclyl" may be a carbon radical or heteroatom radical. "Hetetocyclyl" also comprises radicals where heterocycle radicals are fused with a saturated, partially unsaturated ring, or heterocyclic ring. Some non-limiting examples of heterocyclic rings comprise pyrrolidinyl, tetralydrofuranyl, dihydrofuranyl, tetrahydrothienyl, tetrahydropyranyl, dihydropyranyl, tetrahydrothiopyranyl, piperidino, morpholino, thiomorpholino, thioxanyl, piperazinyl, homopiperazinyl, azetidinyl, oxetanyl, thietanyl, piperidino, homopiperidinyl, epoxypropyl, azepanyl, oxepanyl, thiepanyl, 4-methoxy-piperidin-1-yl, 1,2,3,6-tetrahydropyridin-1-yl, oxazepinyl diazepinyl, thiazepinyl, pyrrolin-1-yl, 2-pyrrolinyl, 3-pyrrolinyl, indolinyl, 2H-pyranyl, 4H-pyranyl, dioxanyl, 1,3-dioxolanyl, pyrazolinyl, dithianyl, dithiolanyl, dihydrothienyl, pyrazolidinylimidazolinyl, imidazolidinyl, 1,2,3,4-tetrahydroisoquinolinyl, 1,2,6-thiadiazane-1, 1-dioxo-2-yl, 4-hydroxy-1,4-azaphosphine-4-oxid-1-yl, 2-hydroxy-1-(piperazin-1-yl)ethanon-4-yl, 2-hydroxy-1-(5, 6-dihydro-1,2,4-triazin-1(4H)-yl)ethanon-4-yl, 5,6-dihydro-4H-1,2,4-oxadiazin-4-yl, 2-hydroxy-1-(5,6-dihydropyridin-1(2H)-yl)ethanon-4-yl, 3-azabicyco[3.1.0]hexanyl, 3-azabicyclo[4.1.0]heptanyl, azabicyclo[2.2.2]hexanyl, 2-methyl-5,6,7,8-tetrahydro-[1,2,4]triazolo[1,5-c]pyrimidin-6-yl, 4,5,6,7-tetrahydroisoxazol[4,3-c]pyridin-5-yl, 3H-indolyl-2-oxo-5-azabicyclo[2.2.1]heptan-5-yl, 2-oxo-5-azabicyclo[2.2.2]octan-5-yl, quinolizinyl and N-pyridyl urea. Some non-limiting examples of a heterocyclic ring comprise 1,1-dioxo-thiomorpholinyl and heterocyclic group wherein two carbon atoms on the ring are substituted with oxo (=O) moieties are pyrimidindionyl. The heterocyclic group disclosed herein may be substituted or unsubstituted, wherein the substituent may be, but is not limited to, oxo (=O), hydroxy, halo, cyano, heteroary, alkoxy, alkylamino, alky, haloaky, alkenyl, alkyl, heterocycly, thiol, nitro, amino, aryloxy, hydroxyl-substituted alkoxy, hydroxyl-substituted alkyl-C(=O)—, alkyl-C(=O)—, alkyl-S(=O), hydroxyl-substituted alkyl-S(=O)—, hydroxyl-substituted alkyl-S (=O)$_2$—, carboxyalkoxy, and the like.

The term "alkoxy" refers to an alkyl group, as previously defined, attached to the principal carbon chain through an oxygen ("alkoxy") atom. Some non-limiting examples comprise methoxy, ethoxy, propoxy, butoxy, and the like. The alkoxy defined above may be substituted or unsubstituted, wherein the substituent may be, but is not limited to, hydroxy, halo, cyano, alkoxy, alkyl, alkenyl, alkynyl, thiol, nitro, amino, and the like.

The terms "r-atom" and "r-membered" can be used interchangeably, where r is an integer, typically describing the number of ring forming atoms in a molecule where the number of ring forming atoms is r. For example, piperidinyl is a 6-atom heterocyclic alkyl group or a 6-membered heterocyclic group, while decahydronaphthyl is a 10-atom cycloalkyl group or a 10-membered cycloalkyl group.

The term "unsaturated" refers to a moiety having one or more degrees of unsaturations.

The term "halogen" refers to F, Cl, Br or I.

The term "aryl" refers to monocyclic, bicyclic, and tricyclic carbocyclic ring systems having a total of 6 to 14 ring members, wherein at least one ring in the system is aromatic, wherein each ring in the system contains 3 to 7 ring members and that has a single point of attachment to the rest of the molecule. The term "aryl" may be used interchangeably with the term "aryl ring". Some non-limiting examples of aryl rings comprise phenyl, naphthyl, and anthracene. The aryl defined herein may be substituted or unsubstituted, wherein the substituent may be, but is not limited to, hydroxy, amino, halogen, cyano, aryl, heteroaryl, alkoxy, alkylamino, alkyl, haloalkyl, alkenyl, alkynyl, heterocyclyl, thiol, nitro, aryloxy, hydroxy-substituted alkoxy, hydroxy-substituted alkyl-C(=O)—, alkyl-C(=O)—, alkyl-S(=O), alkyl-S(=O)$_2$—, hydroxy-substituted alkyl-S(=O), hydroxy-substituted alkyl-S(=O)$_2$—, carboxyalkoxy, and the like.

The term "heteroaryl" used alone or as part of a larger moiety as in "heteroaralkyl" or "heteroarylalkoxy" refers to monocyclic, bicyclic, and tricyclic ring systems having a total of five to fourteen ring members, wherein at least one ring in the system is aromatic, at least one ring in the system contains one or more heteroatoms, wherein each ring in the system contains 3 to 7 ring members and that has a single point of attached to the rest of the molecule. The term "heteroaryl" may be used interchangeably with the term "heteroaryl ring" or the term "heteroaromatic". The heteroaryl defined herein may be substituted or unsubstituted, wherein the substituent may be, but is not limited to, hydroxy, amino, halogen, cyano, aryl, heteroaryl, alkoxy, alkylamino, alkyl, haloalkyl, alkenyl, alkynyl, heterocyclyl, thiol, nitro, aryloxy, hydroxy-substituted alkoxy, hydroxy-substituted alkyl-C(=O)—, alkyl-C(=O), alkyl-S(=O)—, alkyl-S(=O)$_2$—, hydroxy-substituted alkyl-S(=O)—, hydroxy-substituted alkyl-S(=O)$_2$—, carboxyalkoxy, and the like.

The term "heteroatom" refers to one or more of oxygen, sulfur, nitrogen, phosphorus, and selenium, including the forms of any oxidized state of nitrogen, sulfur, and phosphorus; the forms of primary, secondary, and tertiary amines and quaternary ammonium salts; or a substitutable nitrogen of a heterocyclic ring, for example, N (such as N in 3,4-dihydro-2H-pyrrolyl), NH (such as NH in pyrrolidinyl) or NR$^{10}$ (such as NR$^{10}$ in N-substituted pyrrolidinyl).

In other embodiments, the heteroaryl rings comprise, but are not limited to the following monocycles: 2-furanyl, 3-furanyl, N-imidazolyl, 2-imidazolyl, 4-imidazolyl, 5-imidazolyl, 3-isoxazolyl, 4-isoxazolyl, 5-isoxazolyl, 2-oxazolyl, 4-oxazolyl, 5-oxazolyl, 4-methylisoxazol-5-yl, N-pyrroly, 2-pyrroly, 3-pyrolyl, 2-pyridyl, 3-pyridyl, 4-pyridyl, 2-pyriminyl, 4-pyrimidinyl, 5-pyrimidinyl, pyridazinyl (e.g., 3-pyridazinyl), 2-thiazolyl, 4-thiazolyl, 5-thiazoly, tetrazolyl (e.g., 5-tetrazolyl), triazolyl (e.g., 2-triazolyl and 5-triazolyl), 2-thienyl, 3-thienyl, pyrazolyl (e.g., 2-pyrazolyl), isothiazolyl, 1,2,3-oxadiazolyl, 1,2,5-oxadiazolyl, 1,2,4-oxadiazolyl, 1,2,3-triazolyl, 1,2,3-thiadiazolyl, 1,3,4-thiadiazolyl, 1,2,5-thiadiazolyl, 1,3,4-thiadiazol-2-yl, pyrazinyl, 2-pyrazinyl, 1,3,5-triazinyl, benzo[d]thiazol-2-yl, imidazo[1, 5-α]pyridyl and also comprise the following bicycles: benzimidazolyl, benzofuryl, benzothiophenyl, benzothiazolyl, indolyl (e.g., 2-indolyl), purinyl, quinolinyl (e.g., 2-quinolinyl, 3-quinolinyl, 4-quinolinyl), or isoquinolinyl (e.g., 1-isoquinolinyl, 3-isoquinolinyl, or 4-isoquinolinyl).

The term "cyano" or "CN" refers to a cyano structure that can be connected to other groups.

The term "nitro" or "NO$_2$" refers to a nitro group that can be attached to other groups.

The term "protecting group" or "PG" refers to the reaction of a substituent with other functional groups, which is usually used to block or protect special functions. For example, "amino protecting group" refers to a substituent group connected with an amino group to block or protect the functionality of the amino group in a compound. Suitable amino protecting groups include acetyl group, trifluoroacetyl group, tert-butoxycarbonyl group (BOC, Boc), benzyloxycarbonyl group (CBZ, Cbz) and 9-fluorenylmethyleneoxycarbonyl group (Fmoc). Similarly, "hydroxyl protecting group" refers to the substituent of hydroxyl group used to block or protect the functionality of hydroxyl group. Suitable protecting groups include acetyl group and methylsilyl group. "Carboxyl protecting group" refers to the substituent of carboxyl group used to block or protect the functionality of carboxyl group. General carboxyl protecting groups include —CH$_2$CH$_2$SO$_2$Ph, cyanoethyl, 2-(trimethylsilyl)ethyl, 2-(trimethylsilyl) ethoxymethyl, 2-(p-toluenesulfonyl) ethyl, 2-(p-nitrobenzenesulfonyl) ethyl, 2-(diphenylphosphino)ethyl and nitroethyl, and the like. For the general description of protective groups, please refer to T W. Greene, Protective Groups in Organic Synthesis, John Wiley&Sons, New York, 1991; and P. J. Kocienski, Protecting Groups, Thieme, Stuttgart, 2005.

The term "prodrug" refers to a compound that is transformed in vivo into a compound of Formula I. Such a transformation can be affected by hydrolysis in blood or enzymatic transformation of the prodrug form to the parent form in blood or tissue. Prodrugs of the compounds disclosed herein may be, for example, esters. Esters that may be utilized as prodrugs in the present disclosure are phenyl esters, aliphatic (C$_1$-C$_{24}$) esters, acyloxymethyl esters, carbonates, carbamates, and amino acid esters. For example, a compound disclosed herein that contains a hydroxyl group, may be acylated to provide a compound of prodrug form. Other prodrug forms comprise phosphates. For example, these phosphates are obtained from the phosphorylation of a hydroxyl group in the parent compound. A thorough discussion of prodrugs is provided in T. Higuchi and V. Stella, Pro-drugs as Novel Delivery Systems, Vol. 14 of the A.C.S. Symposium Series. Edward B. Roche, ed., Bioreversible Carriers in Drug Design, American Pharmaceutical Association and Pergamon Press, 1987, J. Rautio et al, Prodrugs: Design and Clinical Applications. *Nature Review Drug Discovery*, 2008, 7, 255-270, and S. J. Hecker et al, Prodrugs of Phosphates and Phosphonates, *Journal of Medicinal Chemistry*, 2008, 51, 2328-2345, all of which are incorporated herein by reference.

A "pharmaceutically acceptable salts" used in the present disclosure refer to organic or inorganic salts of a compound disclosed herein pharmaceutically acceptable salts are well known in the art. For example, S. M. Berge et al. describe pharmaceutically acceptable salts in detail in *J. Pharmaceu-* tical Sciences, 1977, 66: 1-19, which is incorporated herein by reference. The pharmaceutically acceptable and nontoxic salts comprise, but are not limited to the inorganic acid salts formed by the reactions with an amino group, such as hydrochloride, hydrobromide, phosphate, sulfate and perchlorate, and organic acid salts, such as acetates, oxalates, maleates, tartrates, citrates, succinates, and malonate, or the salts obtained by other methods used in the literatures, such as ion exchange. Other pharmaceutically acceptable salts comprise adipate, alginate, ascorbate, aspartate, benzenesulfonate, benzoate, bisulfate, borate, butyrate, camphorate, camphorsulfonate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, methanesulfonate, 2-naphthalenesulfonate, nicotinate, nitrate, oleate, palmitate, pamoate, pectinate, persulfate, 3-phenylpropionate, picrate, pivalate, propionate, stearate, thiocyanate, p-toluenesulfonate, undecanoate, valerate salts, and the like. Salts derived from appropriate bases comprise alkali metal, alkaline earth metal, ammonium and N+($C_{1-4}$ alkyl)$_4$ salts. This disclosure also envisions the quaternization of any basic nitrogen-containing groups of the compounds disclosed herein. Water- or oil-soluble or dispersable products may be obtained by such quaternization. Representative alkali or alkaline earth metal salts comprise sodium, lithium, potassium, calcium, magnesium, and the like. Pharmaceutically acceptable salts further comprise, appropriate and nontoxic ammonium, quaternary ammonium, and ammonium cations formed using counterions such as halide, hydroxide, carboxylate, sulfate, phosphate, nitrate, $C_{1-8}$ sulfonate or aryl sulfonate.

Salts of some of the compounds depicted herein can be illustrated by the salts of specific compounds listed below, but does not limit the present application:

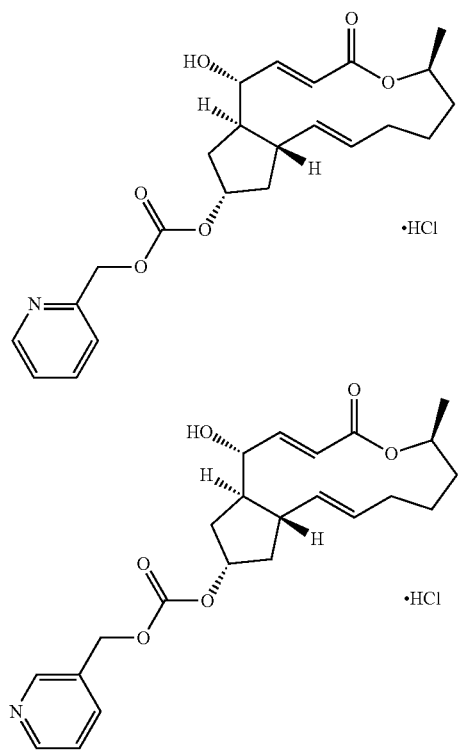

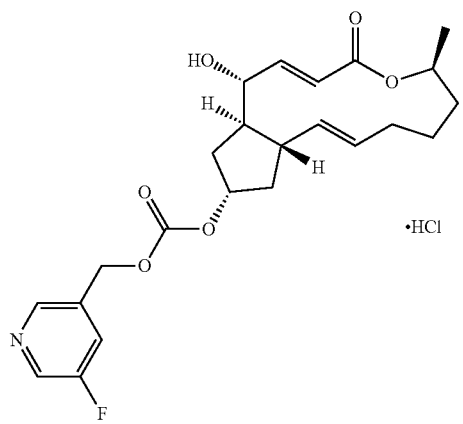

A "solvate" in the present disclosure refers to a complex formed by one or more solvent molecules with a compound disclosed herein. The solvents that form solvates comprise, but are not limited to water, isopropanol, ethanol, methanol, dimethyl sulfoxide, ethyl acetate, acetic acid and ethanolamin. The term "hydrate" refers to the complex where the solvent molecule is water.

The solvates of some of the compounds depicted herein can be illustrated by the specific compounds listed below, but does not limit the present disclosure:

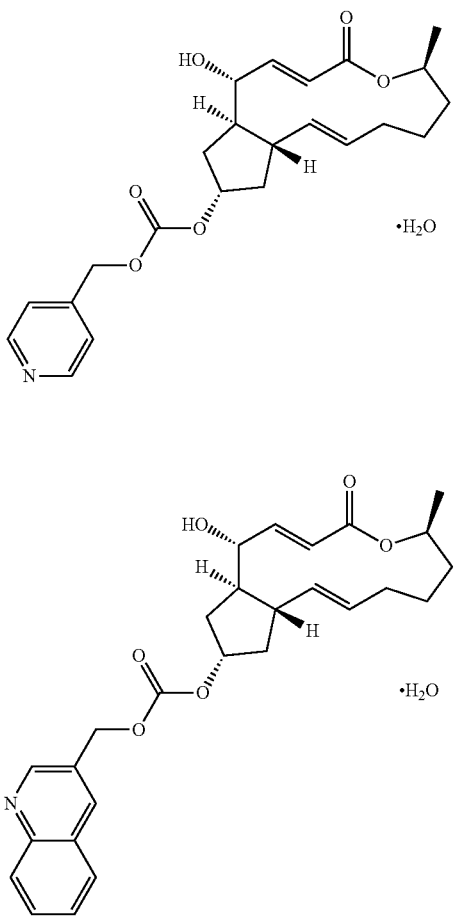

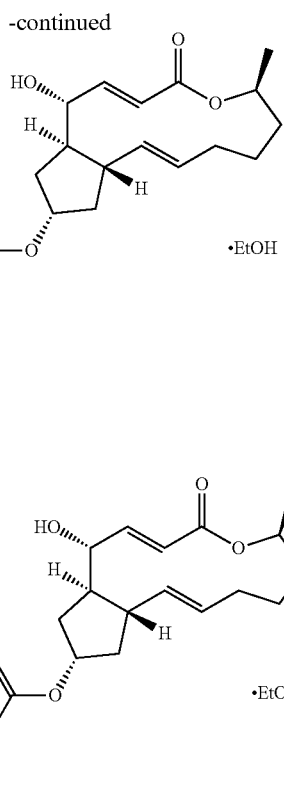

When the solvent is water, the term "hydrate" may be used. In some embodiments, a compound disclosed herein may be combined with a water molecule, such as a hydrate. In other embodiments, a compound disclosed herein can be combined with more than one water molecule, such as dehydrate. In some embodiments, a compound molecule disclosed herein can be combined with less than one water molecule, such as hemihydrate. It should be noted that the hydrate described in the disclosure retains the bioavailability of the compound in a non-hydrated form.

The term "metabolite" refers to the product obtained by the metabolism of a specific compound or the salt thereof in vivo. A metabolite of a compound can be identified by a well-known technique in the art, and its activity can be characterized by an experimental method as described herein. Such products can be obtained by oxidation, reduction, esterification, hydrolysis, degreasing, enzymatic hydrolysis, amidation and/or deamidation of the compound. Accordingly, the disclosure includes metabolites of compounds, comprising metabolites produced by full contact of the compounds disclosed herein with mammals for a period of time.

The term "acute toxicity" refers to the toxic effect or even death caused by the body (human or experimental animal) once (or several times within 24 hours) exposed to foreign compounds. However, it should be pointed out that the speed and intensity of toxic effects of compounds on experimental animals may vary with the quality and quantity of the compounds. Some compounds can cause poisoning symptoms or even death within a few minutes of exposure to lethal dose. Some compounds showed poisoning symptoms and death only after a few days, that is, delayed death. In addition, the meaning of "once" varies according to the way or route of exposure of experimental animals. For oral contact and injection contact in various ways, "once" refers to the instantaneous injection of the tested compound into the body of the experimental animal. The "once" refers to the process that the experimental animals continuously contact with the tested compounds in a specific period of time, so the "once" contains the time factor.

The terms "give" and "administer" compound shall be understood as providing a compound disclosed herein or a prodrug of a compound disclosed herein for an individual in need thereof. It should be appreciated that those skilled in the art can have an impact on tumor proliferation by using an effective amount of the disclosed compound to treat a patient currently suffering from the disorder or to prophylactically treat a patient suffering from the disorder.

The term "treatment" of any disease or disorder refers to all conditions that can slow, interrupt, prevent, control or stop the progress of the disease or disorder, but does not necessarily mean that all symptoms of the disease or disorder have disappeared, and it also includes preventive treatment of the symptoms, especially in patients prone to such disease or disorder. In some embodiments, it means a disease or condition improved (i.e., slowing or preventing or alleviating the development of a disease or at least one of its clinical symptoms). In other embodiments, "treatment" refers to the alleviation or improvement of at least one body parameter, including a body parameter that may not be perceived by the patient. In other embodiments, "treatment" refers to the regulation of a disease or condition from a physical (e.g., stabilizing perceptible symptoms) or physiological (e.g., stabilizing body parameters) or both. In other embodiments, "treatment" means preventing or delaying the onset, occurrence, or deterioration of a disease or condition.

The term "therapeutically effective dose" refers to the amount of the compound disclosed herein capable of eliciting a biological or medical response of an individual (e.g., reducing or inhibiting enzyme or protein activity, or improving symptoms, alleviating symptoms, slowing or delaying disease progression, or preventing disease, and the like.). In a non-limiting embodiment, the term "therapeutically effective dose" refers to the amount that, when administered to an individual, is effective for: (1) at least partially alleviating, inhibiting, preventing and/or improving tumor proliferation. In other embodiments, the term "therapeutically effective dose" refers to the amount of an effective compound disclosed herein capable of at least partially reducing or inhibiting tumor proliferation when administered to a cell, or organ, or non-cellular biological substance, or medium.

The term "composition" refers to a product containing a prescribed amount of prescribed ingredients, and any product produced directly or indirectly by a combination of prescribed amounts of prescribed ingredients. The meaning of this term related to pharmaceutical compositions includes products containing active ingredients (single or multiple) and inert ingredients (single or multiple) that make up the carrier, as well as mixtures, combinations or aggregations of any two or more ingredients, or decomposition of one or more ingredients, or any product produced directly or indirectly by other types of reactions or interactions of one or more components. Accordingly, the pharmaceutical compositions disclosed herein include any compositions prepared by mixing the compounds disclosed herein with a pharmaceutical carrier.

The term "solubility" refers to the mass of solute dissolved when a solid substance reaches saturation state in 100 g solvent at a certain temperature. Solubility test refer to the following references: ZHU Shang-bin, et al. Preparation, characterization, and physicochemical properties of arbutin phospholipid complex[J]. Chinese Traditional and Herbal Drugs. 2020, 1-10.

Microbial Source, Isolation and Purification of BFA Material

Isolation and Purification of the Symbiotic Fungi from the Medicinal Mangrove *Acanthus ilicifolius*

Pretreatment of *Acanthus ilicifolius* Samples

The roots, stems, leaves and mud were collected from medicinal mangroves *Acanthus ilicifolius* in the South China Sea. The roots, stems, and leaves were rinsed with sterile water, blotted dry with absorbent paper, then soaked in 75% alcohol for 30 s and was rinsed three times with sterile artificial seawater. The roots, stems and leaves were cut into tissues of 1 cm$^3$ with a sterile knife to spare.

Isolation of the Symbiotic Fungi from *Acanthus ilicifolius*

Tissue sectioning method: Pre-treated roots, stems and leaves were placed on PDA medium plates under aseptic environment; Homogenization method: Mud was diluted with sterile artificial seawater to three concentrations: $10^{-1}$, $10^{-2}$ and $10^{-3}$ (finally obtained to four concentrations of homogenate) under aseptic environment, 100 μL were taken and inoculated onto PDA medium plates, respectively, and blended with a spreader. The abovementioned plates were incubated in a constant-temperature incubator at 28° C.; PDA medium: potato 200 g, glucose 20 g, sea salt 30 g, water 1 L, agar 20 g/L.

Purification of Symbiotic Fungi from *Acanthus ilicifolius*

After about 2 days of incubation, observing whether there is a single colony, transferring the single colony onto the newly prepared PDA medium plate, and repeatedly isolating and purifying until the pure strain is obtained.

Identification of the Symbiotic Fungus *Penicillium* N29

ITS sequencing was used for molecular identification of the fungi, and the universal upstream primer ITS1 (5'-CTT GGT CAT TTA GAG GAA GTA A-3') and the downstream primer ITS4 (5'-TCC TCC GCT TAT TGA TAT GC-3') were selected, which were used in most of the fungi.

Specific steps for molecular identification:

(1) Genomic DNA extraction: the single colony was picked and placed in 50 μL of Lysis buffer (lysis solution) with a gun tip, and then subjected to heat denaturation at 80° C. for 15 min, followed by centrifugation at 8000 rpm for 1 min, and 3 μL of supernatant was taken as PCR template.

(2) PCR amplification: 34.5 μL of dd H$_2$O, 5 μL of 10×PCR Buffer, 5 μL of dNTP, 1 μL of primer ITS1, 1 μL of primer ITS4, 0.5 μL of ex Taq enzyme and 3 μL of template of extracted fungi were added to a sterile centrifuge tube of 200 μL in sequence; the PCR tube was capped tightly and centrifuged at a low speed of 3000 rpm for 1 min, and then was put into the PCR amplifier. The parameters of the PCR amplifier were set as follows: starting denaturation: 94° C., 5 min; 30 cycles: denaturation 94° C., 30 s, re-denaturation: 57° C., 30 s, extension: 72° C., 50 s; extension: 72° C., 10 min. PCR amplification was started. The amplified centrifuge tubes were sealed and sent to Qingdao Tsingke Zixi Biotechnology Company for sequencing.

(3) The ITS sequences provided by Qingdao Tsingke Zixi Biotechnology Company were subjected to BLAST alignment on NCBI, and the similar strain with more than 99% homology of the fungus obtained was identified as *Penicillium* sp.

Strain Preservation

Glycerol and PDA medium (without agar) were mixed in a volume ratio of 1:4, placed in 1 mL freezer tubes, and the mycelium of the actively growing fungi was picked into each freezer tube with an inoculation loop and stored at −80° C. in an ultra-low temperature refrigerator.

Fermentation of *Penicillium* sp. N29

The frozen storage tubes with *Penicillium* sp. N29 were taken from the −80° C. ultra-low temperature refrigerator, and the strain was inoculated on PDA plates in a biochemical incubator at 28° C., and the strain was activated for 3-5 days; on the ultra-clean table, the strain was inoculated with an inoculation loop into a 500 mL flask containing 250 mL of PDB medium, and the flask after inoculation was placed on a shaker at 120 rpm, 28° C. for incubation for 15 days. PDB medium: potato 200 g, glucose 20 g, sea salt 10 g, water 1 L.

High performance liquid chromatography analysis of the extract of fermentation broth of *Penicillium* sp. N29

(1) Crude extract processing: Two bottles of the fermentation broth were filtered through gauze, and the broth was extracted with equal amount of ethyl acetate for 3 times, and the ethyl acetate phases were combined and concentrated under reduced pressure to provide the crude extract. An appropriate amount of the crude extract was dissolved with acetonitrile, and the supernatant was aspirated and filtered through 0.22 μm pore size filter membrane to remove impurities, and the sample was obtained to spare.

(2) The chromatographic conditions were set as follows: Chromatographic column, ODS (C18) column 4.6×250 mm, 5 nm; column temperature, room temperature; mobile phase, methanol-water system; HPLC conditions: 20%-50% methanol gradient elution at 0-10 min, 50%-100% methanol gradient elution at 10-60 min, 100% methanol isocratic elution at 60-65 min; flow rate, 2.0 mL/min; sample injection volume, 50 μL; UV detection wavelength, 230 nm;

(3) The peak for the target product in the fingerprint of the crude extract was consistent with the Rt (retention time) of the BFA standard, which ranged from 35.5-36.5 min, and the relative percentage was calculated from the peak area to be about 90%.

Isolation and Purification of BFA

The method of macroporous resin solid phase extraction combined with recrystallization reduces the workload of liquid-phase extraction, and simultaneously simplifies the separation approach, avoids the loss of samples caused by traditional techniques such as normal and reverse phase chromatography, gel column chromatography and HPLC, greatly shortens the separation time and improves the separation purity. Utilization of an ethanol-water elution system, which is environmentally friendly and recyclable, reduces the production cost. Specifically, the fermentation broth was filtered with four layers of gauze, and the supernatant was obtained by solid-liquid separation. Using HP20 macroporous sorbent resin, the crude extract of BFA with a content of more than 90% was obtained by elution with 50-70% ethanol. The extract was concentrated under reduced pressure and further recrystallized by $CH_3OH$—$CH_2Cl_2$ to provide the BFA in a high purity. The extract content in the fermentation broth can reach 560 mg/L, wherein the relative percentage of BFA is 90% and the yield is 504 mg/L, providing a new production route for obtaining BFA. The compound was identified as BFA by $^1H$ and $^{13}C$ NMR compared with literature data. $^1H$ NMR (500 MHz, DMSO-d$_6$) δ 7.34 (1H, dd, J=15.5, 3.0 Hz), 5.75-5.60 (2H, overlapped), 5.20 (1H, dd, J=15.2, 9.6 Hz), 5.10 (1H, s), 4.76-4.64 (1H, m), 4.48 (1H, s), 4.08-4.00 (1H, m), 3.92 (1H, d, J=9.2 Hz), 2.36-2.26 (1H, m), 2.02-1.87 (2H, overlapped), 1.87-1.60 (6H, overlapped), 1.54-1.41 (1H, m), 1.34-1.25 (1H, m), 1.18 (3H, d, J=6.3 Hz), 0.80-0.69 (1H, m); $^{13}C$ NMR (125 MHz, DMSO-d$_6$) δ 165.7, 154.4, 137.1, 129.2, 116.3, 74.3, 70.9, 70.5, 51.7, 43.3, 43.1, 40.9, 33.4, 31.5, 26.5, 20.7; ESIMS m/z 281.17 [M+H]⁺.

Description of the Compounds of the Present Disclosure

Disclosed are a class of BFA derivatives, or a stereoisomer thereof, or a nitrogen oxide thereof, or a solvate thereof, or a metabolite thereof, or a pharmaceutical acceptable salt or prodrug, pharmaceutical formulation, combination of the compound for the prevention or treatment of hyperproliferative diseases, such as liver cancer, leukemia, breast cancer, colon adenocarcinoma, lung cancer, Bart's esophageal cancer, gastric cancer, cervical cancer, pancreatic cancer, kidney cancer, endometrial cancer, nasopharyngeal cancer, bone cancer, lymphoma, brain cancer, nerve cancer, oral cancer and colorectal cancer.

In one aspect, the present disclosure relates to a compound represented by Formula (I), or a stereoisomer, a tautomer, a nitrogen oxide, a solvate, a metabolite, an ester or a pharmaceutical acceptable salt of the compound, or a prodrug thereof,

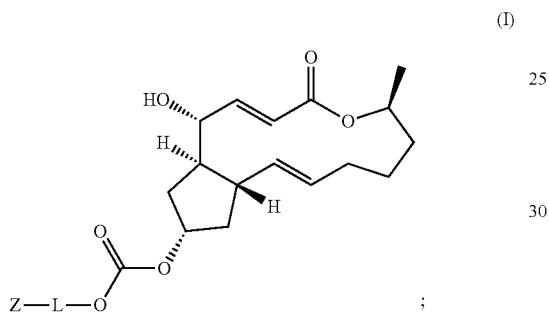

(I)

selected from the group consisting of optionally substituted pyridine ring, quinoline ring, and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, $C_{1-3}$ alkyl, $C_{1-3}$ haloalkyl, $C_{1-3}$ haloalkoxy, $C_{1-3}$ alkoxy, $C_{3-6}$ cycloalkyl, three to six-membered heterocyclyl, aryl and five to six-membered heteroaryl;

and L is a single bond or —$C_{1-6}$— alkylene.

In some embodiments, Z is selected from the group consisting of optionally substituted pyridine ring, quinoline ring and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, methyl, ethyl, n-propyl, isopropyl, difluoromethyl, trifluoromethyl, methoxyl, trifluoromethoxy, ethyoxyl, isopropoxy, cyclopropyl, cyclobutyl, cyclopentyl, cyclohexyl, pyrrolidinyl, pyrazolyl, piperidyl, piperazinyl, tetrahydropyranyl, thiomorpholinyl, phenyl, morpholinyl, thiazolyl, oxazolyl, pyridyl and pyrimidinyl.

In some embodiments, L is selected from a single bond, methylene, ethylidene, propylidene or butylidene.

In some embodiments, the present disclosure relates to one of the following compounds or a stereoisomer thereof, or a nitrogen oxide thereof, or a solvate thereof, or a metabolite thereof, or a pharmaceutical acceptable salt or a prodrug thereof, but not limited to these compounds:

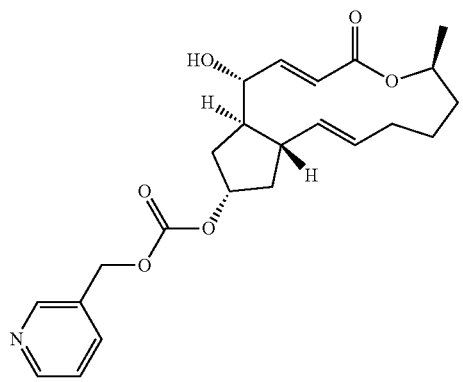

1

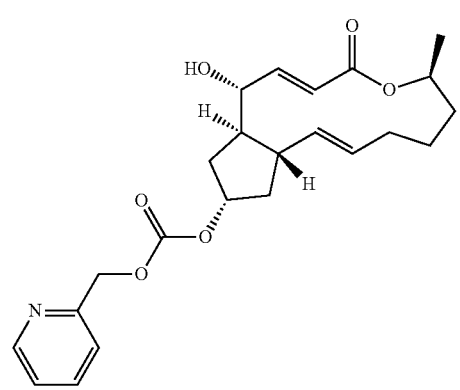

2

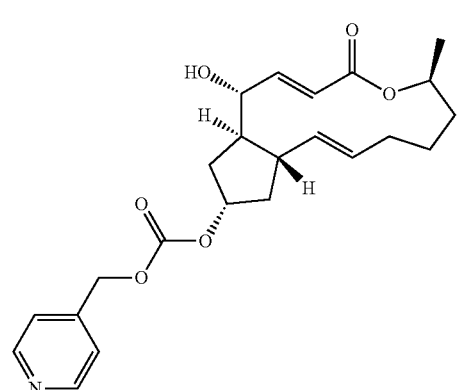

3

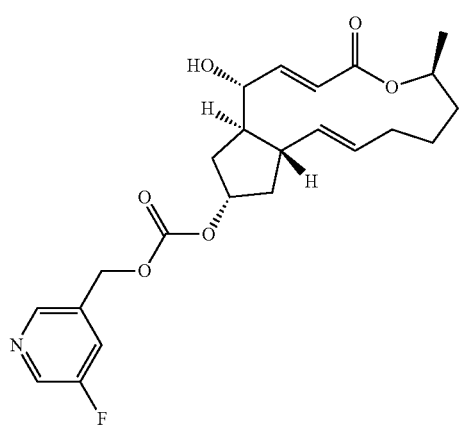

4

5
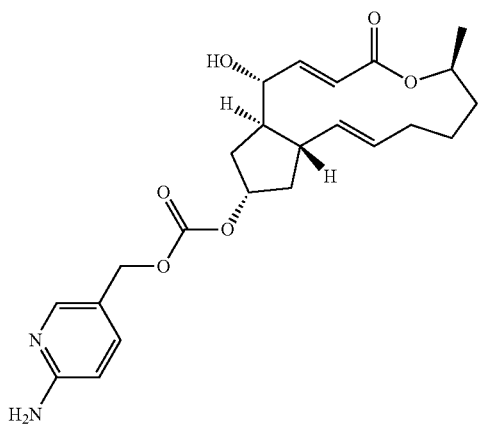
6
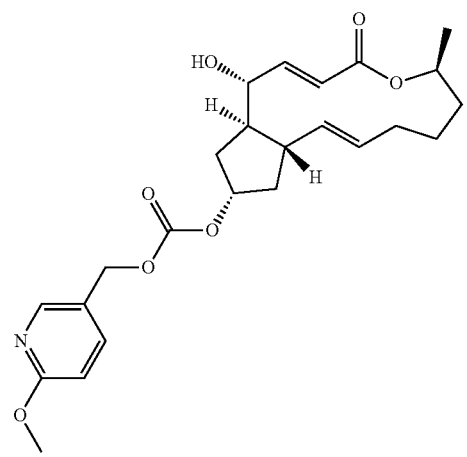
7
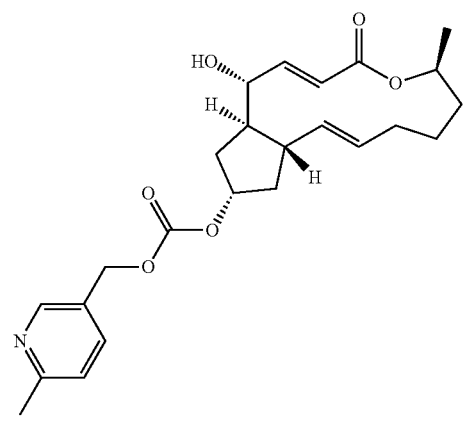
8
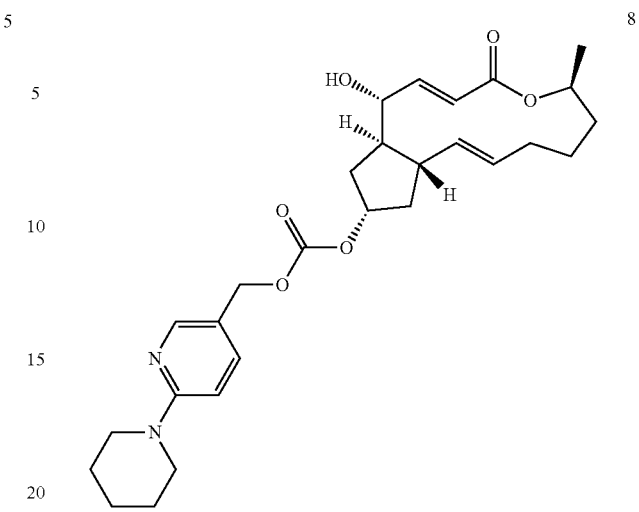
9
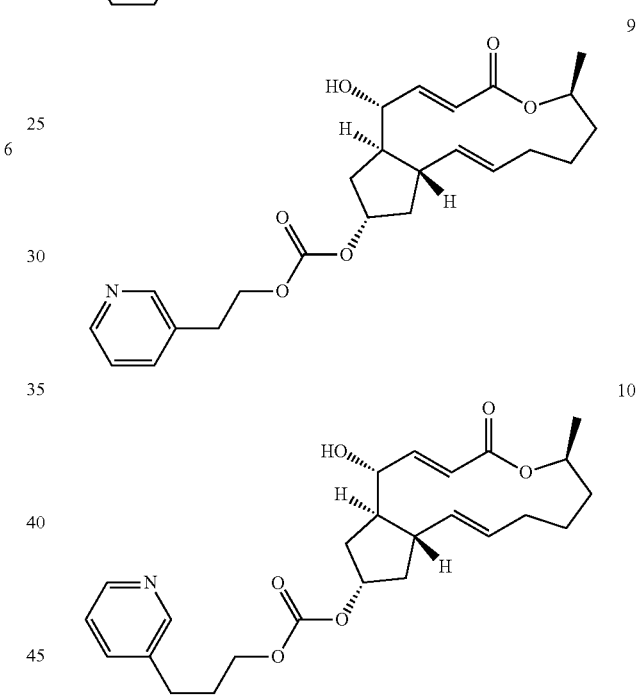
10
11
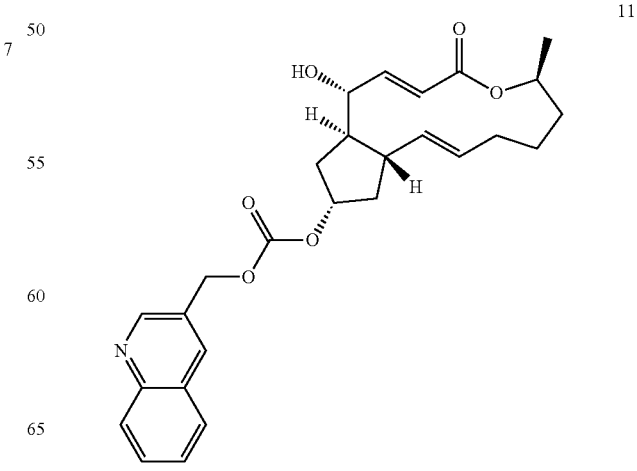

12

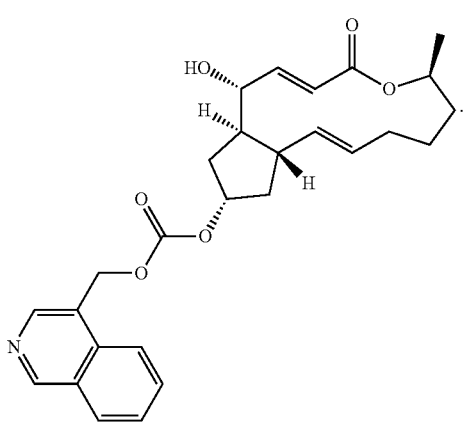

In one aspect, the present disclosure provides a method for preparing the compound in Formula (I),

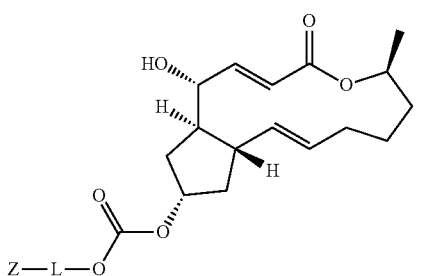
(I)

wherein a compound represented by Formula (I-1) is in solvents, reacts with phosgene or bi- or tri-phosgene and a compound represented by Formula (I-3) in an organic solvent in the presence of a base to give the compound represented by Formula (I),

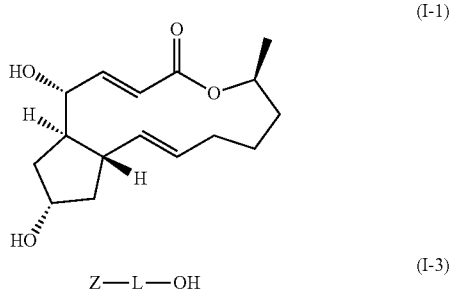
(I-1)

Z—L—OH (I-3)

wherein Z is selected from the group consisting of optionally substituted pyridine ring, quinoline ring, and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, $C_{1-3}$ alkyl, $C_{1-3}$ haloalkyl, $C_{1-3}$ haloalkoxy, $C_{1-3}$ alkoxy, $C_{3-6}$ cycloalkyl, three to six-membered heterocyclyl, aryl and five to six-membered heteroaryl;

and L is a single bond or —$C_{1-6}$— alkylene.

In some embodiments, Z is selected from the group consisting of optionally substituted pyridine ring, quinoline ring and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, methyl, ethyl, n-propyl, isopropyl, difluoromethyl, trifluoromethyl, methoxyl, trifluoromethoxy, ethyoxyl, isopropoxy, cyclopropyl, cyclobutyl, cyclopentyl, cyclohexyl, pyrrolidinyl, pyrazolyl, piperidyl, piperazinyl, tetrahydropyranyl, thiomorpholinyl, phenyl, morpholinyl, thiazolyl, oxazolyl, pyridyl and pyrimidinyl.

In some embodiments, L is selected from a single bond, methylene, ethylidene, propylidene or butylidene.

In some embodiments, the solvent disclosed herein is not specifically limited, and may be any solvent that can dissolve the starting materials to a certain extent and does not inhibit the reactions; specifically, the solvent is acetone or tetrahydrofuran.

In some embodiments, the base disclosed herein is an organic base, including, but not limited to, N,N-dimethyl-4-pyridine, triethylamine, pyridine, diisopropylethylamine, dimethylformamide, and the like.

In some embodiments, the reaction of the compound represented by Formula (I-1) with phosgene or diphosgene or triphosgene and the compound represented by Formula (I-3) to prepare the compound represented by Formula (I) is carried out under heating conditions.

The compounds disclosed in the present disclosure may contain asymmetric or chiral centers, and therefore may exist in different stereoisomeric forms. The present disclosure is intended to make all the stereoisomeric forms of the compound represented by Formula (I), including but not limited to diastereomers, enantiomers, atropisomers and geometric (or conformational) isomers and their mixtures, such as racemic mixtures, become an integral part of the present disclosure.

In the structure disclosed in the present disclosure, when the stereochemistry of any specific chiral atom is not specified, all stereoisomers of the structure are considered in the present disclosure and are included in the present disclosure as the compound disclosed in the present disclosure in. When stereochemistry is indicated by a solid wedge or dashed line representing a specific configuration, then the stereoisomer of the structure is clear and defined.

The compound represented by Formula (I) may exist in different tautomeric forms, and all these tautomers are included in the scope of the present disclosure.

The compound represented by Formula (I) may exist in the form of a salt. The salt refers to a pharmaceutically acceptable salt. The term "pharmaceutically acceptable" includes that the substance or composition must be chemically or toxicologically suitable, related to the other components of the formulation and the mammal used for treatment. The salts of the compounds of the present disclosure also include intermediates used in the preparation or purification of the compound represented by Formula I or the salts of the separated enantiomers of the compound represented by Formula I, but not necessarily pharmaceutically acceptable salts.

If the compound of the present disclosure is basic, the desired salt can be prepared by any suitable method provided in the reference, for example, using mineral acid, such as hydrochloric acid, hydrogen bromide, sulfuric acid, nitric acid, phosphoric acid, and the like. Or use organic acids such as acetic acid, maleic acid, succinic acid, mandelic acid, fumaric acid, malonic acid, pyruvic acid, oxalic acid, glycolic acid and salicylic acid; pyranosonic acid such as glucuronic acid and trigalacturonic acid; α-hydroxy acid, such as citric acid and tartaric acid; amino acid, such as aspartic acid and glutamic acid; aromatic acid, such as benzoic acid and cinnamic acid; sulfonic acid, such as p-toluenesulfonic acid, ethanesulfonic acid, and the like.

If the compound of the present disclosure is acidic, the desired salt can be prepared by a suitable method, such as the use of inorganic or organic bases, such as ammonia (primary, secondary, tertiary), alkali metal hydroxides or alkaline earth metals hydroxide and the like. Suitable salts include, but are not limited to, organic salts derived from amino acids, such as glycine and arginine, ammonia, such as primary, secondary and tertiary ammonia, and cyclic ammonia, such as piperidine, morpholine and piperazine, and obtain inorganic salts from sodium, calcium, potassium, magnesium, manganese, iron, copper, zinc, aluminum and lithium.

The pharmaceutically acceptable salts of the present disclosure can be synthesized from the parent compound, basic or acidic moieties using conventional chemical methods. Generally speaking, such salts can be prepared by reacting the free acid form of these compounds with a stoichiometric amount of a suitable base (such as hydroxide, carbonate, bicarbonate of Na, Ca, Mg or K, and the like.) or by reacting the free base form of these compounds with a stoichiometric amount of a suitable acid. The type of reaction is usually carried out in water or an organic solvent or a mixture of the two. Generally, where appropriate, it is necessary to use a non-aqueous medium such as diethyl ether, ethyl acetate, ethanol, isopropanol, or acetonitrile. For example, "*Remington's Pharmaceutical Sciences*", 20$^{th}$ Version, Mack Publishing Company, Easton, Pa., (1985); and "*Handbook of Pharmaceutical Salts: Properties, Selection, and Use*", a list of other suitable salts can be found in Stahl and Wermuth (Wiley-VCH, Weinheim, Germany, 2002).

In addition, the compounds disclosed in the present disclosure, including their salts, can be also obtained in the form of their hydrates or in the form of containing their solvents (for example, ethanol or DMSO, and the like.), and used for their crystallization. The compounds disclosed in the present disclosure may form solvates inherently or by design with pharmaceutically acceptable solvents (including water); therefore, the present disclosure is intended to include both solvated and unsolvated forms of the compounds disclosed in the present disclosure.

Any structural formula given in the present disclosure is also intended to represent the non-isotopically enriched form and the isotopically enriched form of these compounds. The isotope-enriched compound has the structure depicted by the general formula given in this disclosure, except that one or more atoms are replaced by atoms having the selected atomic weight or mass number. Exemplary isotopes that can be introduced into the compounds of the present disclosure include isotopes of hydrogen, carbon, nitrogen, oxygen, phosphorus, sulfur, fluorine, and chlorine, such as $^2$H, $^3$H, $^{11}$C, $^{13}$C, $^{14}$C, $^{15}$N, $^{17}$O, $^{18}$O, $^{18}$F, $^{31}$P, $^{32}$P, $^{35}$S, $^{36}$Cl and $^{125}$I.

On the other hand, the compounds described in the present disclosure include isotopically enriched compounds defined in the present disclosure, for example, those compounds in which radioisotopes such as $^3$H, $^{14}$C, and $^{18}$F are present, or those in which non-radioactive isotopes such as $^2$H and $^{13}$C. Compounds enriched in this type of isotope can be used for metabolism studies (using $^{14}$C), reaction kinetics studies (using, for example, $^2$H or $^3$H), detection or imaging techniques, such as positron emission tomography (PET), or tissues including drugs or substrates single-photon emission computed tomography (SPECT), which is used for distribution measurement, may be used in radiotherapy of patients. Compounds enriched in $^{18}$F are particularly ideal for PET or SPECT research. The isotope-enriched compound represented by Formula (I) can be prepared by conventional techniques familiar to those skilled in the art or as described in the examples and preparation procedures in this disclosure, using a suitable isotope-labeled reagent instead of the previously used unlabeled reagent.

In addition, the substitution of heavier isotopes, particularly deuterium (i.e., $^2$H or D), can provide certain therapeutic advantages due to higher metabolic stability. For example, increased half-life in vivo or decreased dosage requirements or improved therapeutic index. It should be appreciated that deuterium in the present disclosure is regarded as a substituent of the compound represented by Formula (I). The isotope enrichment factor can be used to define the concentration of such heavier isotopes, especially deuterium. The term "isotopic enrichment factor" as used in the present disclosure refers to the ratio between the isotopic abundance and the natural abundance of the specified isotope. If the substituent of the compound of the present disclosure is designated as deuterium, the compound has at least 3500 (52.5% deuterium incorporation at each designated deuterium atom), at least 4000 (60% deuterium incorporation), for each designated deuterium atom, At least 4500 (67.5% deuterium doping), at least 5000 (75% deuterium doping), at least 5500 (82.5% deuterium doping), at least 6000 (90% deuterium doping), at least 6333.3 (95% deuterium doping) Deuterium incorporation), at least 6466.7 (97% deuterium incorporation), at least 6600 (99% deuterium incorporation), or at least 6633.3 (99.5% deuterium incorporation) isotope enrichment factor. Pharmaceutically acceptable solvates of the present disclosure include those in which the crystallization solvent may be isotopically substituted, such as D$_2$O, acetone-d$_6$, and/or DMSO-d$_6$.

On the other hand, the present disclosure relates to intermediates for the preparation of compounds represented by Formula (I).

On the other hand, the present disclosure relates to methods for the preparation, isolation and purification of the compound represented by Formula (I).

Pharmaceutical Compositions, Formulations and Administration of the Present Disclosure The pharmaceutically acceptable compositions of the present disclosure further comprise a pharmaceutically acceptable carrier, excipient, or excipient, which may be in liquid, solid, semi-solid, gel, or spray dosage form. These, in the present disclosure, are suitable for the specific target dosage form, include any solvents, diluents or other liquid excipients, dispersants or suspending agents, surfactants, isotonic agents, thickeners, emulsifiers, preservatives, solid binders or lubricants, and the like. As described in the following literature: In Remington: The Science and Practice of Pharmacy, 21st edition, 2005, ed. D. B. Troy, Lippincott Williams & Wilkins, Philadelphia, and Encyclopedia of Pharmaceutical Technology, eds. J. swarb rick and J. C. Boylan, 1988-1999, Marcel Dekker, New York. Combining the contents of the literature here, it shows that different carriers can be used in pharmaceutically acceptable preparations of compositions and their well-known preparation methods. In addition to the scope of incompatibility between any conventional carrier media and the compounds of the present disclosure, such as any adverse biological effect or interaction with any other component of the pharmaceutically acceptable composition in a harmful manner, the use is also the scope of consideration of the disclosure.

The pharmaceutical composition disclosed in the present disclosure is prepared using techniques and methods known to those skilled in the art. For the description of some common methods in the art, please refer to Remington's Pharmaceutical Sciences (Mack publishing company).

The disclosure provides methods for treating, preventing or improving a disease or disorder, including administering a safe and effective amount of a combination drug comprising a compound disclosed in the present disclosure and one or more therapeutic active agents. Among them, the combination drugs include one or more drugs for the prevention or treatment of liver cancer, leukemia, breast cancer, colon adenocarcinoma, lung cancer, Bart's esophageal cancer, gastric cancer, and cervical cancer, pancreatic cancer, kidney cancer, endometrial cancer, nasopharyngeal cancer, bone cancer, lymphoma, brain cancer, nerve cancer, oral cancer and colorectal cancer. The active ingredient of the drug is different from the compound disclosed herein.

Drugs for the prevention or treatment of liver cancer, leukemia, breast cancer, colon adenocarcinoma, lung cancer, Bart's esophageal cancer, gastric cancer, cervical cancer, pancreatic cancer, kidney cancer, endometrial cancer, nasopharyngeal cancer, bone cancer, lymphatic cancer, brain cancer, nerve cancer, oral cancer and colorectal cancer include, but are not limited to: aromatase inhibitors, topoisomerase II inhibitors, microtubule activators, topoisomerase I inhibitors, alkylating agent, compounds that induce cell differentiation, cyclooxygenase inhibitors, MMP inhibitors, Mtor inhibitors, anti-tumor and anti-metabolic drugs, histone deacetylase inhibitors, platinum compounds, compounds that target/reduce protein or lipid phosphokinase activity and other anti-vascular production compounds, anti-proliferative antibodies, telomerase inhibitors, Ras carcinogenic inhibitors, heparanase inhibitors, proteasome inhibitors or any combination thereof.

The dose of the active component in the disclosed composition can be changed, but the amount of the active component must be the amount in which the appropriate dosage form can be obtained. The active components can be administered to patients (animals and people) in need of such treatment at doses that provide the best drug efficacy. The dosage chosen depends on the desired therapeutic effect, the route of administration and the duration of treatment. The dose will vary with the patient, depending on the nature and severity of the disease, the patient's weight, the patient's specific diet, the drugs used at the same time, and other factors that will be recognized by those skilled in the art. The dosage range is usually about 0.5 mg to 1.0 g per patient per day, which can be given in single or multiple doses. In one embodiment, the dose ranges from about 0.5 mg to 500 mg per day for each patient. In another embodiment, the dose ranges from about 0.5 mg to 200 mg per day for each patient. In another embodiment, the dose ranges from about 5 mg to 50 mg per day for each patient.

It should be also recognized that certain compounds of the present disclosure may exist in free form for therapeutic use or, if appropriate, in the form of their pharmaceutically acceptable derivatives. Pharmaceutically acceptable derivatives include pharmaceutically acceptable prodrugs, salts, esters and salts of these esters, or any other adducts or derivatives that can directly or indirectly provide the compounds or metabolites or residues of the present disclosure when administered to patients in need.

When the pharmaceutical composition of the present disclosure contains one or more other active components in addition to the compounds of the present disclosure, the weight ratio of the compounds of the present disclosure to the second active component may vary and depend on the effective dose of each component. Usually, the effective dose of each is used. Therefore, for example, when a compound of the present disclosure is mixed with another agent, the weight ratio of the compound of the present disclosure to another agent usually ranges from about 1000:1 to about 1:1000, for example, from about 200:1 to about 1:200. Mixtures of the compounds of the present disclosure with other active components are generally within the above range, but in each case an effective dose of each active component should be used.

"Pharmaceutically acceptable excipient" as used in the present disclosure means a pharmaceutically acceptable material, mixture or solvent related to the consistency of the dosage form or pharmaceutical composition. Each excipient must be compatible with other components of the pharmaceutical composition when mixed, so as to avoid interactions that will greatly reduce the efficacy of the compounds disclosed in the present disclosure and lead to interactions that are not pharmaceutically acceptable pharmaceutical compositions when administered to patients. In addition, each excipient must be pharmaceutically acceptable, for example, of sufficiently high purity.

The appropriate pharmaceutically acceptable excipients will vary according to the specific dosage form selected. In addition, pharmaceutically acceptable excipients can be selected according to their specific functions in the composition. For example, certain pharmaceutically acceptable excipients that can contribute to the production of uniform dosage forms may be selected. Some pharmaceutically acceptable excipients that can contribute to the production of stabilizer type can be selected. Certain pharmaceutically acceptable excipients that assist in carrying or transporting the disclosed compounds from one organ or part of the body to another organ or part of the body when administered to a patient may be selected. Some pharmaceutically acceptable excipients can be selected to enhance patient compliance.

Suitable pharmaceutically acceptable excipients include the following types of excipients: diluents, fillers, adhesives, disintegrating agents, lubricants, flow aids, coating agents, wetting agents, cosolvents, suspension aids, sweeteners, solvents, flavor correctors, emulsifiers, taste masking agents, colorants, granulating agents, anti-caking agents, humectants, plasticizers, tackifiers, chelators, antioxidants preservatives, stabilizers, surfactants and buffers. Technicians may recognize that some pharmaceutically acceptable excipients can provide more than one function and provide alternative functions, depending on how much of the excipient is present in the preparation and what other excipients are present in the preparation.

The medicament or pharmaceutical composition disclosed in the present disclosure can be prepared and packaged in bulk form, in which a safe and effective amount of compound shown in Formula (I) can be extracted and then given to the patient in the form of powder or syrup. In general, patients are given doses ranging from 0.0001 to 10 mg/kg body weight per day to achieve an effective effect. Alternatively, the pharmaceutical composition disclosed in the present disclosure can be prepared and packaged as a unit dosage form, in which each physically discrete unit contains a safe and effective amount of the compound shown in Formula (I). When prepared in a unit dosage form, the pharmaceutical compositions disclosed in the present disclosure can generally contain, for example, 0.5 mg to 1 g, or 1 mg to 700 mg, or 5 mg to 100 mg of the compounds disclosed in the present disclosure.

Those skilled in the art have the knowledge and skills to enable them to select an appropriate amount of a suitable pharmaceutically acceptable excipient for use in the present disclosure. In addition, there are a large number of resources available to technicians who describe pharmaceutically acceptable excipients and use them to select appropriate pharmaceutically acceptable excipients. Examples include Remington's Pharmaceutical Sciences (Mack publishing company), the Handbook of pharmaceutical additions (Gower Publishing Limited), and the Handbook of pharmaceutical exceptions (the American Pharmaceutical Association and the pharmaceutical Press).

Therefore, on the other hand, the present disclosure relates to a process for preparing a pharmaceutical composition comprising a compound disclosed in the present disclosure and a pharmaceutically acceptable excipient, carrier, adjuvant, solvent or a combination thereof, and the process comprising a mixture of various ingredients. The pharmaceutical compositions containing the compound disclosed in the present disclosure may be prepared by mixing at, for example, at ambient temperature and atmospheric pressure.

The compounds disclosed in the present disclosure are generally formulated into a dosage form suitable for administration to patients through a desired route. For example, dosage forms include those suitable for the following routes of administration: (1) Oral administration, such as capsules, pills, lozenges, capsules, powders, elixirs, tablets, suspensions, solutions, syrups, emulsions, sachets and cachets; (2) Parenteral administration, such as sterile solutions, suspensions and reconstituted powders; (3) Transdermal administration, such as transdermal patches; (4) Rectal administration, such as suppositories; (5) Inhalation, such as aerosols, solutions and dry powders; (6) Topical administration, such as ointments, lotions, creams, solutions, sprays, pastes, foams and gels.

In some embodiments, the compounds disclosed herein can be formulated into oral dosage forms. In some embodiments, the compounds disclosed herein can be formulated into inhaled dosage forms. In some other embodiments, the compounds disclosed herein can be formulated for transnasal dosage forms. In some other embodiments, the compounds disclosed herein can be formulated for transdermal dosage forms. In some embodiments, the compounds disclosed herein can be formulated into a topical dosage forms.

The pharmaceutical compositions provided herein can be provided as pressed tablet, a manufactured tablet, a chewable spindle, an instant tablet, a multiple compressed tablet, an enteric-coated tablet, icing or film coating. Enteric coated tablet is a kind of pressed tablet coated with substances that can resist gastric acid but dissolve or disintegrate in the intestine, so as to prevent the active ingredients from contacting the acidic environment of the stomach. Intestinal coating includes, but is not limited to, fatty acid, fat, phenyl salicylate, wax, lac, ammoniated lac and cellulose phthalate. The sugar coated tablet is a pressed tablet surrounded by sugar coating, which can help to cover up the unpleasant taste or smell and prevent the tablet from oxidation. The film coated tablet is a thin layer of water-soluble substance or a pressed tablet covered by a film. The film coating includes, but is not limited to, hydroxyethyl cellulose, sodium carboxymethyl cellulose, PEG 4000 and cellulose phthalate acetate. Film coating has the same general characteristics as sugar coating. The compound compression tablet is a compression tablet prepared after more than one compression cycle, including multi-layer tablets compression coated or dry coated tablets.

Tablet formulations may be prepared from active ingredients in powder, crystalline or granular form, individually or in combination with one or more carriers or excipients disclosed herein, including adhesives, disintegrant agents, controlled release polymers, lubricants, diluents and/or colorants. Flavor enhancers and sweeteners are particularly useful in the formation of chewable tablets and pastilles.

The pharmaceutical compositions provided by the present disclosure can be provided in liquid and semi-solid dosage forms, including emulsions, solutions, suspensions, elixirs and syrups. The emulsion is a two-phase system, in which one liquid is completely dispersed in the other liquid in the form of small balls, which can be oil in water or water in oil. Emulsions may include pharmaceutically acceptable non-aqueous liquids and solvents, emulsifiers and preservatives. Suspensions may include pharmaceutically acceptable suspension aids and preservatives. Aqueous alcohol solutions may include pharmaceutically acceptable acetals, such as di-(lower alkyl)-acetals of lower alkyl aldehydes, such as acetaldehyde diethyl acetals, and a water-soluble solvent having one or more hydroxyl groups, such as propylene glycol and ethanol. Elixir is a transparent, sweet water alcohol solution. Syrups are aqueous solutions of concentrated sugars, such as sucrose, and can also contain preservatives. For liquid dosage forms, for example, solutions in polyethylene glycol may be diluted with a sufficient amount of a pharmaceutically acceptable liquid carrier, such as water, for accurate and convenient administration.

Other useful liquid and semi-solid dosage forms include, but are not limited to, those containing the active ingredient provided in the present disclosure and the secondary mono or poly alkylene glycol, which includes: 1,2-dimethoxymethane, diethylene glycol dimethyl ether, triethylene glycol dimethyl ether, tetraethylene glycol dimethyl ether, polyethylene glycol-350-dimethyl ether, polyethylene glycol-550-dimethyl ether PEG-750-dimethyl ether, in which 350, 550 and 750 refer to the approximate average molecular weight of PEG. These preparations may further include one or more antioxidants, such as butylated hydroxytoluene (BHT), butylated hydroxyanisole (BHA), propyl gallate, vitamin E, hydroquinone, hydroxycoumarin, ethanolamine, lecithin, cephalin, ascorbic acid, malic acid, sorbitol, phosphoric acid, bisulfite, sodium pyrosulfite, thiodipropionic acid and its esters, and dithiocarbamates.

As appropriate, the dosage unit of oral administration can be encapsulated in microcapsules. It can be also prepared into compositions that extend or maintain the release, for example by coating or embedding the particulate material in a polymer, wax or similar.

The oral pharmaceutical composition provided by the present disclosure can be also provided in the form of liposomes, micelles, microspheres or nanosystems. Micellar formulations can be prepared by the method described in U.S. Pat. No. 6,350,458.

The pharmaceutical compositions provided by the present disclosure can be provided in non-effervescent or effervescent granules and powders to reconstitute liquid dosage forms. Pharmaceutically acceptable carriers and excipients used in non-effervescent granules or powders may include diluents, sweeteners and wetting agents. Pharmaceutically acceptable carriers and excipients used in effervescent granules or powders may include organic acids and carbon dioxide sources.

The pharmaceutical composition provided by the present disclosure can be provided in soft capsules or hard capsules, which can be prepared from gelatin, methylcellulose, starch or calcium alginate. The hard gelatin capsule, also known as dry filled capsule (DFC), is composed of two sections, one of which is inserted into the other section, thus completely encapsulating the active ingredient. Soft elastic capsules (SEC) are soft spherical shells, such as gelatin shells, which are plasticized by adding glycerol, sorbitol or similar polyols. Soft gelatin shells can contain preservatives to prevent microbial growth. Suitable preservatives are those as described in the present disclosure, including methylparaben and propyl paraben, and sorbic acid. The liquid, semi-solid and solid dosage forms provided by the present disclosure can be encapsulated in capsules. Suitable liquid and semi-solid dosage forms include solutions and suspensions in propylene carbonate, vegetable oil or triglycerides. Capsules containing such a solution may be as described in U.S. Pat. Nos. 4,328,245; 4,409,239 and 4,410,545. The capsule can be also coated as known by those skilled in the art, so as to improve or maintain the dissolution of the active ingredient.

Colorants and flavorings can be used in all of the above formulations.

The compounds disclosed in the present disclosure can be also combined with soluble polymers as targeted drug carriers. Such polymers include polyvinylpyrrolidone, pyran copolymers, poly (hydroxypropyl methylacrylamide)-phenol, poly (hydroxyethyl asparagine)-phenol, or poly (oxyethylene)-polylysine substituted with palmityl residues. In addition, the disclosed compounds can be used in drug control release of a class of biodegradable polymers, for example, polylactic acid, s-poly epsilon-caprolactone, poly hydroxybutyrate, get together the original acid ester, polyacetal, dihydro pyran, cyanoacrylate and hydrogel crosslinking or amphiphilic block copolymer.

The pharmaceutical compositions provided by the present disclosure can be formulated or modified release dosage forms, including delayed, sustained-release, pulse, controlled, targeted and programmed release forms.

The pharmaceutical composition provided by the present disclosure can be formulated with other active ingredients that do not impair the expected therapeutic effect, or with substances that supplement the expected effect.

The pharmaceutical composition provided by the present disclosure can be formulated into any dosage form suitable for parenteral administration, including solution, suspension, emulsion, micelle, liposome, microsphere, nano system and solid form suitable for making solution or suspension in liquid before injection. Such dosage forms can be prepared according to the conventional methods known to the technical personnel in the field of pharmaceutical science (see Remington: The science and Practice of Pharmacy, above).

Pharmaceutical compositions intended for parenteral administration may include one or more pharmaceutically acceptable carriers and excipients, including, but not limited to, aqueous carriers, water miscible carriers, nonaqueous carriers, antimicrobial agents or antimicrobial growth inhibitors, stabilizers, solubilizing enhancers, isotonic agents, buffers, antioxidants, local anesthetics, suspending agent and dispersant, wetting agent or emulsifier, complexing agent, multivalent chelating agent or chelating agent, antifreeze, cryoprotectant, thickener, pH regulator and inert gas.

The pharmaceutical composition provided by the present disclosure can be administered by injection, infusion or implantation outside the intestines and stomach for local or systemic administration. Parenteral administration as used in the present disclosure includes intravenous, intra-arterial, intraperitoneal, intrathecal, intraventricular, intraurethral, intrasternal, intracranial, intramuscular, synovial and subcutaneous administration.

Suitable aqueous carriers include, but are not limited to, water, saline, normal saline or phosphate buffered saline (PBS), sodium chloride injection, ringers injection, isotonic glucose injection, sterile water injection, glucose and lactated Ringers injection. Nonaqueous carriers include, but are not limited to, non-volatile oils of plant origin, castor oil, corn oil, cottonseed oil, olive oil, peanut oil, peppermint oil, safflower oil, sesame oil, soybean oil, hydrogenated vegetable oil, medium chain triglycerides of hydrogenated soybean oil and coconut oil, and palm seed oil. Water miscible carriers include, but are not limited to, ethanol, 1,3-butanediol, liquid polyethylene glycol (e.g., PEG 300 and PEG 400), propylene glycol, glycerol, N-methyl-2-pyrrolidone, N, N-dimethylacetamide, and dimethyl sulfoxide.

Suitable antimicrobial agents or preservatives include, but are not limited to, phenol, mercury, benzyl alcohol, cresol, chlorobutanol, methyl p-hydroxybenzoate and propyl p-hydroxybenzoate, benzalkonium chloride (e.g., benzalkonium chloride), thiomersal, methyl and propyl nipagin, and sorbic acid. Suitable isotonic agents include, but are not limited to, sodium chloride, glycerol and glucose. Suitable buffers include, but are not limited to, phosphate and citrate. Suitable antioxidants are those as described in the present disclosure, including bisulfite and sodium metabisulfite. Suitable local anesthetics include, but are not limited to, procaine hydrochloride. Suitable suspension aids and dispersants are those as described in the present disclosure, including sodium carboxymethyl cellulose, hydroxypropyl methyl cellulose and polyvinylpyrrolidone. Suitable emulsifiers include those described in the present disclosure, including polyoxyethylene dehydrated sorbitol monolaurate, polyoxyethylene dehydrated sorbitol monooleate 80, and triethanolamine oleate. Suitable multivalent chelating agents or chelating agents include, but are not limited to, EDTA. Suitable pH regulators include, but are not limited to, sodium hydroxide, hydrochloric acid, citric acid and lactic acid. Suitable complexing agents include, but are not limited to, cyclodextrins, including $\alpha$-cyclodextrin, $\beta$-cyclodextrin, hydroxypropyl-$\beta$-cyclodextrin, sulfobutyl ether-$\beta$-cyclodextrin and sulfobutyl ether 7-$\beta$-cyclodextrin (Captisol©, CyDex, Lenexa, KS).

The pharmaceutical composition provided by the present disclosure can be formulated into single dose or multi dose administration. The single dose preparation is packaged in ampoules, vials or syringes. The multi dose parenteral preparation must contain an antimicrobial agent with bacteriostatic or antifungal concentration. All parenteral preparations must be sterile, as known and practiced in the art.

In one embodiment, the pharmaceutical composition is provided in a ready to use sterile solution.

In another embodiment, the pharmaceutical composition is provided as a sterile dry soluble product, including a lyophilized powder and a subcutaneous injection tablet, which is reconstituted with a carrier before use. In another embodiment, the pharmaceutical composition is formulated as a ready to use sterile suspension. In a further embodiment, the pharmaceutical composition is formulated as a sterile dry insoluble product reconstituted with a carrier prior to use. In another embodiment, the pharmaceutical composition is formulated as a ready to use sterile emulsion.

The pharmaceutical composition can be configured as suspension, solid, semi-solid or thixotropic liquid which is used as a reservoir for implantable drug delivery. In one embodiment, the pharmaceutical composition disclosed in the present disclosure is dispersed in a solid internal matrix surrounded by an external polymeric membrane that is insoluble in body fluids but allows the active ingredients in the pharmaceutical composition to diffuse through.

Suitable internal substrates include polymethylmethacrylate, polybutylacrylate, plasticized or unplasticized polyvinyl chloride, plasticized nylon, plasticized polyethylene terephthalate, plasticized polyethylene terephthalate, natural rubber, polyethylene, polyisoprene, polyisobutylene, polybutadiene, polydimethylsiloxane, ethylene vinyl acetate copolymer Silicone rubber, silicone carbonate copolymer, hydrophilic polymer such as acrylic acid and methacrylic acid ester hydrogel, collagen, cross-linked polyvinyl alcohol and crosslinked partially hydrolyzed polyvinyl acetate.

Suitable external polymeric films include polyethylene, polypropylene, ethylene/propylene copolymer, ethylene/ethyl acrylate copolymer, ethylene/vinyl acetate copolymer, silicone rubber, polydimethylsiloxane, chloroprene rubber, chlorinated polyethylene, polyvinyl chloride, copolymer of ethylene chloride and vinyl acetate, vinylidene chloride, ethylene and propylene, ionic crosslinking polymers include polyethylene terephthalate, butyl rubber, chlorohydrin rubber, ethylene/vinyl alcohol copolymer, ethylene/vinyl acetate/vinyl alcohol trimer and ethylene/vinyl alcohol copolymer.

On the other hand, the pharmaceutical composition disclosed in the present disclosure can be formulated into any dosage form suitable for inhalation administration to patients, such as dry powder, aerosol, suspension or solution composition. In one embodiment, the pharmaceutical composition disclosed in the present disclosure can be formulated into a dosage form suitable for inhalation administration to patients with dry powder. In another embodiment, the pharmaceutical composition disclosed in this disclosure can be formulated into a dosage form suitable for inhalation of a patient through a sprayer. A dry powder composition delivered to the lung by inhalation typically comprises a fine powder like compound as disclosed in the present disclosure and one or more fine powder like pharmaceutically acceptable excipients. Pharmaceutically acceptable excipients particularly suitable for use as dry powders are known to those skilled in the art, including lactose, starch, mannitol, and mono-, di- and polysaccharides. Fine powders can be prepared by, for example, micronization and grinding. In general, a reduced size (e.g., micronized) compound can be defined by a $D_{50}$ value of about 1 to 10 microns (e.g., measured by laser diffraction).

The aerosol can be prepared by suspending or dissolving the compounds disclosed in the present disclosure in a liquefied propellant. Suitable propellants include chlorinated hydrocarbons, hydrocarbons and other liquefied gases. Representative propellants include: trichlorofluoromethane (propellant 11), difluoromethane (HFA-32), difluoromethane (propellant 12), dichlorotetrafluoroethane (propellant 114), tetrafluoroethane (HFA-134a), 1,1-difluoroethane (HFA-152a), pentafluoroethane (HFA-12), heptafluoropropane (HFA-227a), perfluoropropane, perfluorobutane, perfluoropentane, butane Isobutane and pentane. Aerosols containing the compounds disclosed in the present disclosure are generally administered to patients through a metered dose inhaler (MDI). Such a device is known to those skilled in the art.

Aerosols may contain additional pharmaceutically acceptable excipients that can be used by MDIs, such as surfactants, lubricants, cosolvents, and other excipients, to improve the physical stability, valve characteristics, solubility, or taste of the preparation.

The pharmaceutical composition suitable for transdermal drug delivery can be prepared into discontinuous patch, which is intended to keep close contact with the epidermis of the patient for a prolonged period of time. For example, the active ingredient can be delivered from the patch by ion permeation as generally described in *Pharmaceutical Research,* 3 (6), 318 (1986).

The pharmaceutical composition suitable for local administration can be formulated as ointment, cream, suspension, lotion, powder, solution, paste, gel, spray, aerosol or oil. For example, ointments, creams and gels can be formulated with water or oil matrix, and suitable thickeners and/or gels and/or solvents. Such a matrix may include water and/or oil, such as liquid paraffin and vegetable oil (such as peanut oil or castor oil) or a solvent such as polyethylene glycol. Thickeners and gels based on matrix properties include soft paraffin, aluminum stearate, cetyl stearyl alcohol, polyethylene glycol, lanolin, beeswax, polycarboxyethylene and cellulose derivatives and/or monostearic acid glyceride and/or nonionic emulsifiers.

Local preparations can be administered once or more a day in the affected area. Closed dressings covering the skin are preferred. Adhesive storage system can achieve continuous or extended drug delivery.

Lotion can be prepared with water or oil base, and usually contains one or more emulsifiers, stabilizers, dispersants, suspending agents or thickeners.

The external powder can be formed in the presence of any suitable powder matrix such as talc, lactose or starch. Drops may be prepared from an aqueous or nonaqueous matrix containing one or more dispersants, solubilizers, suspending agents or preservatives.

Use of the Compounds and Compositions of the Present Disclosure

The compounds or pharmaceutical compositions disclosed in the present disclosure can be used to prepare for the treatment, prevention, improvement, control or alleviation of hyperproliferative diseases in mammals, including humans.

In particular, the compounds of the present disclosure can be used as drugs for the preparation of prevention or treatment of human hyperproliferative diseases, including liver cancer, leukemia, breast cancer, colon adenocarcinoma, lung cancer, Bart's esophageal cancer, gastric cancer, cervical cancer, pancreatic cancer, kidney cancer, endometrial cancer, nasopharyngeal cancer, bone cancer, lymphatic, brain cancer, nerve cancer, oral cancer and colorectal cancer.

The compounds or compositions of the present disclosure can be applied to, but are not limited to, the use of effective amounts of the compounds or compositions disclosed herein for administration to patients to prevent, treat or alleviate hyperproliferative diseases in mammals, including humans.

In addition to being beneficial to human treatment, the compounds and pharmaceutical compositions disclosed herein can be also applied to veterinary treatment of pets, imported animals and mammals in farm animals. Other examples of animals include horses, dogs and cats. Herein, compounds of the present disclosure include pharmaceutically acceptable derivatives thereof.

Therapeutic Method

In one embodiment, the treatment method disclosed in the present disclosure includes giving a safe and effective amount of the compound or a pharmaceutical composition containing the disclosed compound to a patient in need. The embodiments of the present disclosure include methods for treating the above-mentioned diseases by giving a safe and effective amount of the compounds of the present disclosure or a pharmaceutical composition containing the compounds of the present disclosure to patients in need.

In an embodiment, a compound disclosed in the present disclosure or a pharmaceutical composition comprising the compound disclosed in the present disclosure may be administered by any suitable route of administration, including systemic administration and local administration. Systemic administration includes oral administration, parenteral administration, transdermal administration and rectal administration. Typical parenteral administration refers to administration by injection or infusion, including intravenous, intramuscular and subcutaneous injection or infusion. Topical administration includes administration to the skin as well as to the eyes, ears, vagina, inhalation and nose. In one embodiment, a compound disclosed in the present disclosure or a pharmaceutical composition comprising the compound disclosed in the present disclosure may be administered orally. In another embodiment, a compound disclosed in the present disclosure or a pharmaceutical composition comprising the compound disclosed in the present disclosure may be an inhalation administration. In another embodiment, the compound disclosed in the present disclosure or containing the compound disclosed in the present disclosure may be intranasal administration.

In one embodiment, the compound disclosed in the present disclosure or the pharmaceutical composition containing the compound disclosed in the present disclosure can be administered once, or several times at different time intervals within a specified time period according to the administration scheme. For example, once, twice, three or four times a day. In one embodiment, the drug is administered once a day. In another implementation, the drug was administered twice a day. It can be administered until the desired therapeutic effect is achieved or maintained indefinitely. The appropriate dosage regimen of a compound disclosed in the present disclosure or a pharmaceutical composition containing the compound disclosed in the present disclosure depends on the pharmacokinetic properties of the compound, such as dilution, distribution and half-life, which can be determined by a skilled person. In addition, the suitable administration scheme of the compounds disclosed in the present disclosure or the pharmaceutical composition containing the compounds disclosed in the present disclosure, including the duration of implementing the scheme, depends on the disease being treated, the severity of the disease being treated, the age and physical condition of the patient being treated, the medical history of the patient being treated, the nature of the simultaneous therapy, and the dosage regimen The desired therapeutic effect and other factors are within the scope of technical personnel's knowledge and experience. Such a technician should also understand that the individual patient's response to the dosing regimen, or the individual patient's need to change over time, may require adjustment of the dosing regimen.

The compounds disclosed in the present disclosure can be administered at the same time with one or more other therapeutic agents, or before or after. The compounds of the present disclosure can be administered separately or together with other therapeutic agents in the form of pharmaceutical compositions through the same or different administration routes.

For an individual of about 50-70 kg, the disclosed pharmaceutical compositions and combinations of the disclosure can be in a unit dose form containing about 1-1000 mg, or about 1-500 mg, or about 1-250 mg, or about 1-150 mg, or about 0.5-100 mg, or about 1-50 mg of the active ingredient. The therapeutically effective amount of a compound, a pharmaceutical composition or a combination thereof depends on the species, weight, age and condition of the individual, the disorder or disease being treated or the severity thereof. Doctors, clinicians or veterinarians with common skills can easily decide the effective amount of each active ingredient needed in the development process to prevent, treat or suppress disorders or diseases.

The above cited dose characteristics have been confirmed in vitro and in vivo experiments using advantageous mammals (e.g. mice, rats, dogs, monkeys) or their organs, tissues and specimens in vitro. The compounds disclosed in the present disclosure can be used in vitro in the form of solutions, such as aqueous solutions, or in the form of suspensions or aqueous solutions in vivo, enteral or parenteral, especially intravenously.

In one embodiment, the therapeutically effective dose of the compounds disclosed in the present disclosure ranges from about 0.1 mg to about 2000 mg per day. The pharmaceutical composition thereof should provide a dose of the compound of about 0.1 mg to about 2000 mg. In a particular embodiment, the prepared drug dose unit form can provide about 1 mg to about 2000 mg, about 10 mg to about 1000 mg, about 20 mg to about 500 mg, or about 25 mg to about 250 mg of the main active ingredients or a combination of the main ingredients in each dose unit form. In a particular embodiment, the prepared drug dose unit form can provide about 10 mg, 20 mg, 25 mg, 50 mg, 100 mg, 250 mg, 500 mg, 1000 mg or 2000 mg of the main active ingredient.

In addition, the compounds disclosed in the present disclosure can be administered in a prodrug form. In the present disclosure, the "prodrugs" of the compounds disclosed herein are functional derivatives that can eventually release the compounds disclosed in the present disclosure in vivo when administered to patients. When a compound disclosed herein is given in the form of a prodrug, a person skilled in the art may implement one or more of the following modes: (a) change the in vivo onset time of the compound; (b) change the duration of action of the compound in vivo; (c) change the internal transport or distribution of compounds; (d) change the solubility of the compound in vivo; and (e) overcome the side effects or other difficulties faced by the compounds. Typical functional derivatives used in the preparation of prodrugs include variants of compounds that are cleaved chemically or enzymatically in vivo. These variants including the preparation of phosphates, amides, esters, thioesters, carbonates and carbamates are well known to those skilled in the art.

General Synthesis Procedures

Examples are listed below to describe the invention. However, it needs to be understood that the present invention is not limited to these examples, but merely provides a method for the practice of the present invention.

Generally, the compounds disclosed herein may be prepared by methods described herein, wherein the substituents are as defined for Formula (I), except further noted. The following reaction solutions and examples are presented to further exemplify the invention.

The solvents used in the present disclosure, including anhydrous tetrahydrofuran, dioxane, toluene and ether are obtained by refluxing the solvent with sodium. Anhydrous methylene chloride and chloroform were obtained by refluxing the solvent with calcium hydride. Ethyl acetate, petroleum ether, hexane, N,N-dimethyl acetamide and N,N-dimethyl formamide were treated with anhydrous sodium sulfate prior to use.

Persons skilled in the art will recognize that the chemical reactions described may be readily adapted to prepare a number of other compounds disclosed herein, and alternative methods for preparing the compounds disclosed herein are deemed to be within the scope disclosed herein. For example, the synthesis of non-exemplified compounds according to the invention may be successfully performed by modifications apparent to those skilled in the art, e.g., by appropriately protecting interfering groups, by utilizing other suitable reagents known in the art other than those described, or by making routine modifications of reaction conditions. In addition, the reactions or known reaction conditions disclosed herein will be recognized as having applicability for preparing other compounds disclosed herein.

In the examples described below, unless otherwise indicated all temperatures are set forth in degrees Celsius. Reagents were purchased from commercial suppliers such as Aldrich Chemical Company, Arco Chemical Company and Alfa Chemical Company, and were used without further purification unless otherwise indicated. Common solvents were purchased from commercial suppliers such as Shantou Xilong Chemical Factory, Guangdong Guanghua Reagent Chemical Factory Co. Ltd., Guangzhou Reagent Chemical Factory, Tianjin YuYu Fine Chemical Ltd., Tianjin Fuchen Reagent Chemical Factory, Wuhan Xinhuayuan Technology Development Co. Ltd. Qingdao Tenglong Reagent Chemical Ltd., and Qingdao Ocean Chemical Factory.

The reactions set forth below were done generally under a positive pressure of nitrogen or argon or with a drying tube (unless otherwise stated) in anhydrous solvents, and the reaction flasks were typically fitted with rubber septa for the introduction of substrates via syringe. Glassware was dried.

The NMR spectra were recorded with a Bruker 400 MHz or 600 MHz spectrometer at ambient temperature. The NMR spectra were obtained as $CDCl_3$, DMSO-$d_6$, $CD_3OD$ or acetone-$d_6$ solutions (reported in ppm), using TMS (0 ppm) or chloroform (7.26 ppm) as the reference standard. When peak multiplicities are reported, the following abbreviations are used: s (singlet), d (doublet), t (triplet), m (multiplet), br (broadened), brs (broadened singlet), dd (doublet of doublets), dt (doublet of triplets). Coupling constants J are reported in Hertz (Hz).

The determination conditions of MS data were as follows: Agilent 6120 quadrupole HOLC-M (Zorbax SB-C18, 2.1× 30 mm, 3.5 μm, 6 min, flow rate 0.6 mL/min). Mobile phase: 5%-95% (containing 0.1% formic acid $CH_3CN$) in the ratio (containing 0.1% formic acid $H_2O$), electrospray ionization (ESI), at 210 nm/254 nm, detected by UV.

The purity of the compound was determined by high performance liquid chromatography (HPLC), Agilent 1260 HPLC (Agilent Zorbax Eclipse Plus C18) and DAD detector. Finally, the purity of the compound was calculated by area normalization method.

Column chromatography was conducted using a silica gel column. Silica gel (200-300 mesh, 300-400 mesh) was purchased from Qingdao Ocean Chemical Factory.

The following abbreviations are used throughout the present disclosure:
$CDCl_3$ deuterated chloroform
DMAP 4-dimethylaminopyridine
DMSO-$d_6$ deuterated dimethyl sulfoxide
g gram
h hour
min minute
mmol millimole
M mol/L
° C. degrees centigrade
MeCN, $CH_3CN$ acetonitrile
MeOH methanol
mL, ml milliliter
RT, rt, r.t. room temperature
eq equivalent
rpm r/min
Rt retention time Typical synthetic steps for preparing the compound disclosed herein are shown in the following synthetic scheme. Unless otherwise specified, the Z and L disclosed herein have the meanings described in the present disclosure.

Synthesis scheme 1

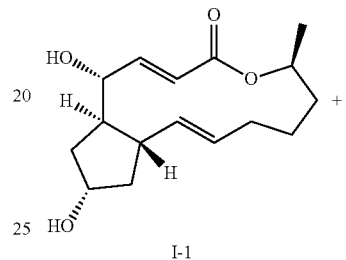

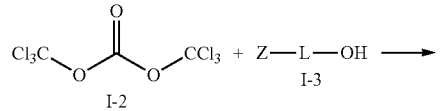

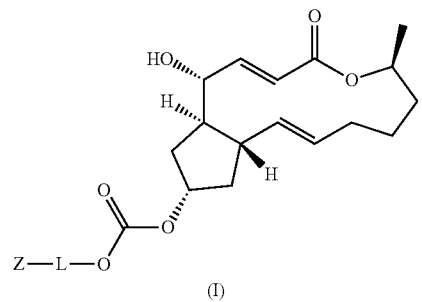

The compound of Formula (I) was synthesized by the reaction of BFA (1-1) and triphosgene (1-2) under alkaline conditions, and then reacted with corresponding alcohol (1-3). The alkali comprises, but is not limited to DMAP and the like. The reaction is carried out in an inert solvent. The solvent comprises, but is not limited to acetone and the like.

The compounds, pharmaceutical compositions and the use thereof provided in the present disclosure are further described in combination with the examples.

EXAMPLES

Example 1: BFA-7-(pyridine-3-ylmethyl)carbonate (Compound 1)

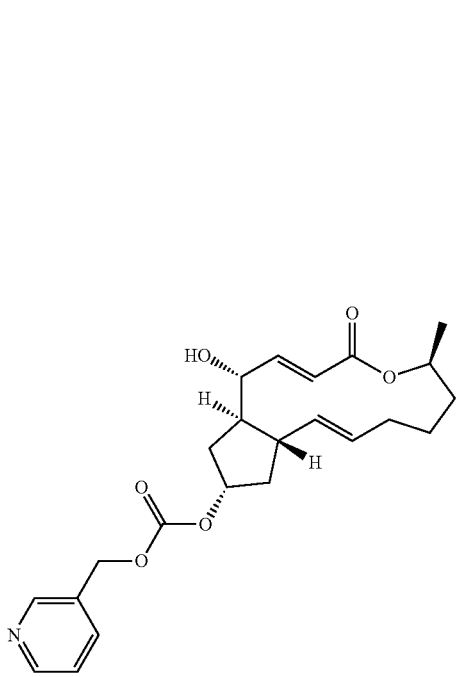 [SMILES: C[C@H]1CCC/C=C/[C@@H]2C[C@H](OC(=O)OCc3cccnc3)C[C@H]2[C@H](O)/C=C/C(=O)O1]

BFA (50 mg, 1 eq) and triphosgene (50 mg, 1 eq) were dissolved in 3 ml of dry acetone under nitrogen. After stirring at room temperature for 10 min, 2 mL of acetone solution of DMAP (100 mg, 5 eq) was added dropwise slowly. After stirring for 5 min, the system was transferred to an oil bath preheated to 65° C. After stirring for another 15 min, 1 mL of acetone solution of 3-pyridinemethanol (0.15 mL, 8 eq) was added dropwise slowly. The resultant mixture was stirred for 2 h after dripping. The reaction solution was concentrated under reduced pressure. The crude extract was purified twice by reversed-phase silica gel column chromatography and HPLC, respectively. The product was obtained in a yield of 30%.

$^1$H NMR (600 MHz, CDCl$_3$) δ=8.61-8.49 (2H, m), 7.69 (1H, dt, J=7.8, 2.0), 7.34-7.26 (2H, m), 5.89 (1H, dd, J=15.6, 1.9), 5.67 (1H, ddd, J=15.0, 10.2, 4.6), 5.18 (1H, dd, J=15.2, 9.4), 5.10 (2H, s), 5.04-4.99 (1H, m), 4.79 (1H, dqd, J=12.5, 6.2, 1.7), 4.06 (1H, ddd, J=9.5, 3.1, 1.9), 2.40-2.22 (3H, m), 2.01-1.75 (5H, m), 1.72-1.58 (2H, m), 1.47 (1H, dddd, J=14.7, 10.9, 7.4, 2.4), 1.20 (3H, d, J=6.3), 0.91-0.83 (1H, m). $^{13}$C NMR (150 MHz, CDCl$_3$) δ=166.40, 154.53, 152.08, 149.71, 149.51, 136.41, 135.90, 131.14, 130.99, 123.69, 117.70, 79.70, 75.53, 71.76, 66.77, 51.92, 43.91, 39.96, 38.63, 34.12, 31.78, 26.67, 20.86. HRESIMS m/z 416.2061 [M+H]$^+$ (calcd [C$_{23}$H$_{30}$NO$_6$]$^+$, 416.2068).

Example 2: BFA-7-(pyridine-2-ylmethyl)carbonate (Compound 2)

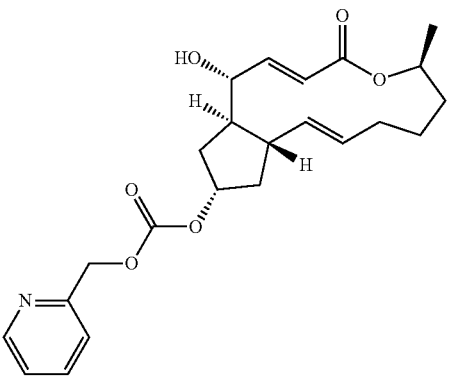 [SMILES: C[C@H]1CCC/C=C/[C@@H]2C[C@H](OC(=O)OCc3ccccn3)C[C@H]2[C@H](O)/C=C/C(=O)O1]

According to the preparation method of Example 1, a colorless oil was obtained in a yield of 41%. $^1$H NMR (400 MHz, CDCl$_3$) δ 8.59 (1H, d, J=4.5 Hz), 7.71 (1H, td, J=1.8, 7.7 Hz), 7.38 (1H, d, J=7.8 Hz), 7.34 (1H, dd, J=3.1, 15.7 Hz), 7.24 (1H, dd, J=4.9, 7.6 Hz), 5.91 (1H, dd, J=1.9, 15.7 Hz), 5.72 (1H, m), 5.26 (3H, overlapped), 5.11 (1H, m), 4.85 (1H, m), 4.12 (1H, dt, J=2.4, 9.7 Hz), 2.36 (3H, overlapped), 2.02 (1H, m), 1.87 (4H, overlapped), 1.71 (2H, overlapped), 1.52 (1H, m), 1.26 (3H, d, J=6.0 Hz), 0.93 (1H, m). ESIMS m/z 416.21 [M+H]$^+$.

Example 3: BFA-7-(pyridine-4-ylmethyl)carbonate (Compound 3)

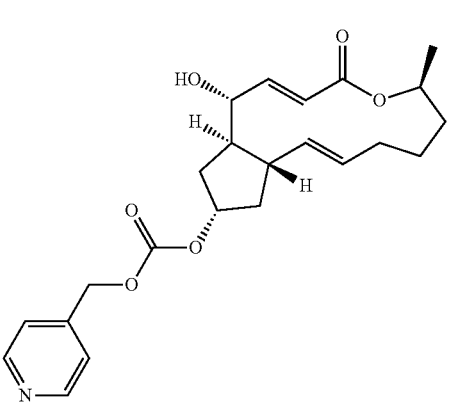 [SMILES: C[C@H]1CCC/C=C/[C@@H]2C[C@H](OC(=O)OCc3ccncc3)C[C@H]2[C@H](O)/C=C/C(=O)O1]

According to the preparation method of Example 1, a colorless oil was obtained in a yield of 38%. $^1$H NMR (400 MHz, CDCl$_3$) δ 8.62 (2H, s), 7.34 (1H, dd, J=3.2, 15.7 Hz), 7.28 (2H, s), 5.92 (1H, dd, J=1.9, 15.7 Hz), 5.73 (1H, m), 5.26 (1H, m), 5.15 (2H, s), 5.10 (1H, m), 4.87 (1H, m), 4.13 (1H, d, J=9.4 Hz), 2.36 (3H, overlapped), 2.02 (1H, m), 1.86 (4H, overlapped), 1.72 (2H, m), 1.51 (1H, m), 1.25 (3H, d, J=6.2 Hz), 0.88 (1H, m). ESIMS m/z 416.21 [M+H]$^+$.

Example 4: BFA-7-(quinoline-3-ylmethyl)carbonate (Compound 11)

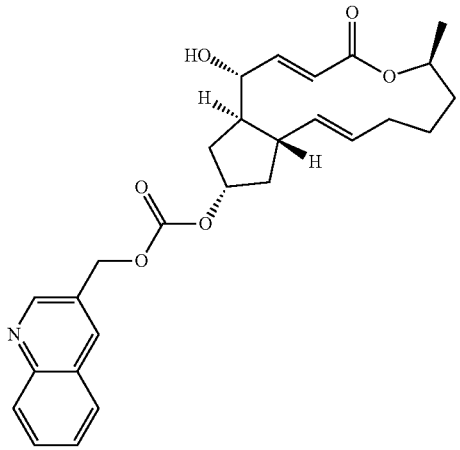 [SMILES: C[C@H]1CCC/C=C/[C@@H]2C[C@H](OC(=O)OCc3cnc4ccccc4c3)C[C@H]2[C@H](O)/C=C/C(=O)O1]

According to the preparation method of Example 1, a colorless oil was obtained in a yield of 35%. $^1$H NMR (400 MHz, CDCl$_3$) δ 8.93 (1H, d, J=2.2 Hz), 8.19 (1H, d, J=2.2 Hz), 8.12 (1H, d, J=8.5 Hz), 7.84 (1H, d, J=8.2 Hz), 7.74 (1H, m), 7.58 (1H, m), 7.32 (1H, dd, J=3.2, 15.7 Hz), 5.90 (1H, dd, J=1.9, 15.7 Hz), 5.70 (1H, m), 5.33 (2H, s), 5.22 (1H, dd, J=9.0, 15.2 Hz), 5.08 (1H, m), 4.84 (1H, m), 4.11 (1H, m), 2.34 (3H, m), 1.97 (1H, m), 1.86 (4H, m), 1.70 (2H, m), 1.50 (1H, m), 1.25 (3H, d, J=6.2 Hz), 0.94 (1H, m). ESIMS m/z 466.55 [M+H]$^+$.

Example 5: BFA-7-(4-methoxy-pyridine-3-ylmethyl)carbonate (Compound 6)

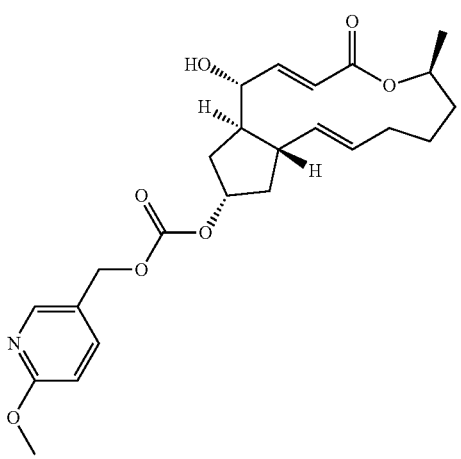 [SMILES: COc1ccc(COC(=O)O[C@@H]2C[C@H]3[C@H](O)/C=C/C(=O)O[C@@H](C)CCC/C=C/[C@@H]3C2)cn1]

According to the preparation method of Example 1, a colorless oil was obtained in a yield of 53%. $^1$H NMR (400 MHz, CDCl$_3$) δ 8.17 (1H, d, J=2.4 Hz), 7.61 (1H, dd, J=2.5, 8.6 Hz), 7.32 (1H, dd, J=3.1, 15.7 Hz), 6.73 (1H, d, J=8.5 Hz), 5.89 (1H, dd, J=1.9, 15.6 Hz), 5.69 (1H, m), 5.20 (1H, dd, J=9.1, 15.1 Hz), 5.05 (3H, overlapped), 4.83 (1H, m), 4.09 (1H, dd, J=4.3, 7.3 Hz), 3.92 (3H, s), 2.31 (3H, m), 1.98 (1H, m), 1.83 (4H, m), 1.68 (2H, m), 1.50 (1H, m), 1.24 (3H, d, J=6.2 Hz), 0.90 (1H, m). ESIMS m/z 446.51 [M+H]$^+$.

Example 6: BFA-7-(5-fluoro-pyridine-3-yl methyl)carbonate (Compound 4)

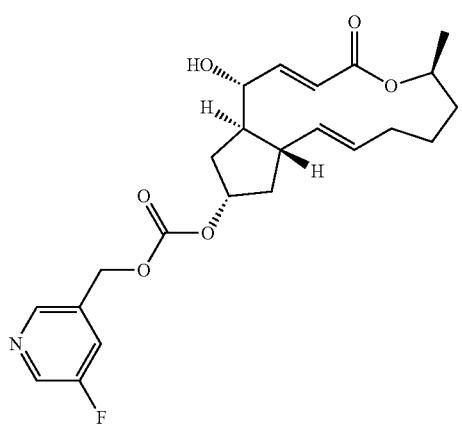 [SMILES: C[C@H]1CCC/C=C/[C@@H]2C[C@H](OC(=O)OCc3cncc(F)c3)C[C@H]2[C@H](O)/C=C/C(=O)O1]

According to the preparation method of Example 1, a colorless oil was obtained in a yield of 48%. $^1$H NMR (400 MHz, CDCl$_3$) δ 8.46 (2H, d, J=3.0 Hz), 7.47 (1H, dt, J=2.3, 8.8 Hz), 7.33 (1H, dd, J=3.2, 15.7 Hz), 5.91 (1H, dd, J=1.9, 15.8 Hz), 5.72 (1H, m), 5.24 (1H, m), 5.17 (2H, s), 5.08 (1H, p, J=4.8 Hz), 4.85 (1H, m), 4.12 (1H, d, J=9.0 Hz), 2.35 (3H, overlapped), 2.01 (1H, m), 1.88 (4H, m), 1.70 (2H, m), 1.53 (1H, m), 1.25 (3H, d, J=6.1 Hz), 0.95 (1H, m). ESIMS m/z 434.48 [M+H]$^+$.

Example 7: BFA-7-(pyridine-3-yl ethyl)carbonate (Compound 9)

According to the preparation method of Example 1, a colorless oily liquid was obtained in a yield of 43%. $^1$H NMR (400 MHz, CDCl$_3$) δ 8.48 (1H, dd, J=1.7, 4.9 Hz), 8.43 (1H, d, J=2.3 Hz), 7.58 (1H, dt, J=2.0, 7.9 Hz), 7.36 (1H, dd, J=3.1, 15.6 Hz), 7.28 (1H, m), 5.97 (1H, dd, J=1.9, 15.6 Hz), 5.71 (1H, m), 5.27 (1H, dd, J=5.8, 15.3 Hz), 4.95 (1H, m), 4.86 (1H, m), 4.43 (1H, m), 4.26 (1H, m), 4.10 (1H, dt, J=2.6, 9.9 Hz), 2.98 (2H, m), 2.39 (1H, m), 2.28 (1H, m), 2.19 (1H, m), 2.02 (1H, m), 1.85 (2H, m), 1.73 (2H, m), 1.66 (2H, m), 1.52 (1H, m), 1.26 (3H, d, J=6.2 Hz), 0.95 (1H, m). ESIMS m/z 430.51 [M+H]$^+$.

Example 8: Solubility Test

Objective: To compare the difference in solubility of the compounds disclosed herein with BFA.

Methods: Excess BFA and the compounds disclosed herein were added to 10 mL of three solvents, methanol, acetone and 5% DMSO+95% $H_2O$, respectively, and shaken on a shaker at 37° C. at 100 r/min for 24 h. After 24 h, the samples were centrifuged at 15 000 r/min for 15 min to remove the undissolved compounds. The supernatant was filtered using a 0.45 μm membrane filter. The supernatant was appropriately diluted with methanol and contents of the compounds were determined by HPLC method to calculate the solubility.

Results:

TABLE 1

Solubility of the compounds disclosed herein (x ± s, n = 3)

| Compound | Solubility (mg · mL$^{-1}$) | | |
|---|---|---|---|
| | Methanol | Acetone | 5% DMSO + 95% $H_2O$ |
| BFA | 3.13 ± 1.24 | 3.13 ± 1.24 | 0.085 ± 0.03 |
| Compound 1 | 74.34 ± 2.52 | 68.72 ± 2.53 | 2.73 ± 0.21 |
| Compound 2 | 73.29 ± 3.52 | 69.36 ± 2.23 | 2.48 ± 1.55 |
| Compound 3 | 70.28 ± 4.35 | 69.614 ± 1.74 | 2.65 ± 1.60 |
| Compound 4 | 69.43 ± 3.51 | 63.76 ± 3.53 | 2.72 ± 0.33 |
| Compound 6 | 70.37 ± 3.35 | 70.61 ± 1.44 | 2.95 ± 1.61 |
| Compound 9 | 68.97 ± 1.81 | 68.76 ± 2.53 | 2.70 ± 0.77 |
| Compound 11 | 69.28 ± 4.35 | 67.63 ± 2.74 | 2.65 ± 1.80 |
| Compound A | 9.93 ± 1.21 | 9.36 ± 1.26 | 0.25 ± 0.13 |
| Compound B | 9.76 ± 1.21 | 9.55 ± 1.23 | 0.26 ± 0.16 |
| Compound C | 9.44 ± 1.51 | 9.26 ± 1.13 | 0.25 ± 0.23 |
| Compound D | 20.45 ± 1.41 | 21.16 ± 1.12 | 0.51 ± 0.13 |

Note:
The present disclosure tests, in parallel, the compounds, in which Z is substituted by phenyl ring or alkyl, and disubstituted compounds in the preparation process for control, namely

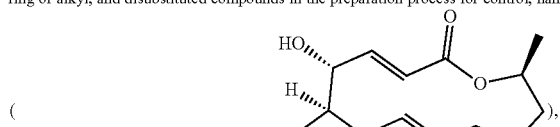

compound A

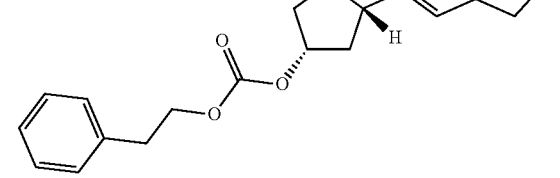

compound B

TABLE 1-continued

Solubility of the compounds disclosed herein (x ± s, n = 3)

| Compound | Solubility (mg · mL$^{-1}$) | | |
|---|---|---|---|
| | Methanol | Acetone | 5% DMSO + 95% $H_2O$ | compound C compound D

The results showed that the compounds disclosed herein exhibited higher solubility in the three solvents, methanol, acetone and 5% DMSO+95% $H_2O$, than BFA as well as the compounds, in which Z is substituted by phenyl ring or alkyl, and disubstituted compounds, which showed significant advantages.

Example 9: Bioactivity Test

Test 1 Cell Proliferation Assay

1) Principle

CCK-8 method: The CCK-8 method is a highly sensitive, non-radioactive colorimetric assay for the determination of the number of viable cells in cell proliferation or cytotoxicity assays. The orange formazan dye produced by the bioreduction of CCK-8 by intracellular dehydrogenase is soluble in the cell culture medium, and the amount of formazan dye produced is proportional to the number of living cells. The kit used in this method is the tetrazolium salt-WST-8 (2-(2-methoxy-4-nitrophenyl)-3-(4-nitrophenyl)-5-(2,4-disulfophenyl)-2H-tetrazolium monosodium salt) developed by Dojindo Chemical Research Institute (Dojindo), which is capable of being reduced to a water-soluble formazan dye in the presence of the electronic carrier 1-Methoxy PMS.

2) Cell Culture and Preparation of Test Compounds

Human cervical cancer cells Hela, pancreatic cancer cells PANC-1, esophageal cancer cells Eca-109, human leukemia cells K562, human lung cancer cells A549, human liver cancer cells HepG2, human gastric cancer cells MKN-45, human breast cancer cells MCF7 were cultured in DMEM medium containing 10% FBS (fetal bovine serum), 100 U/mL penicillin and 100 μg/ml streptomycin. Hepatocellular carcinoma cells Bel-7402 were cultured in RPMI-1640 medium containing 10% FBS (fetal bovine serum), 100 U/ml penicillin and 100 μg/ml streptomycin. All cells were placed in a cell culture incubator at 37° C. with 5% $CO_2$. Cells fluid was changed every 3-5 days, and after 80% cell fusion, trypsin digestion and passaging were performed to keep the cells in good logarithmic growth phase.

All the samples to be tested were dissolved in DMSO.
3) Assay Method

Cells in logarithmic growth phase were inoculated in 96-well plates with 5000 cells/well respectively, and after 24 h of incubation, samples were added (final concentrations as shown in the table), and biplicate wells were set up for each sample. The amount of solvent of DMSO was not higher than 2‰. After 72 h, 10 μL of CCK-8 solution was added to each well and incubated for 1.5~3 h at 37° C. The OD value at 450 nm was measured on an plate reader.

Inhibition rate (%)=(1−[($OD_{450}$ dosed well−$OD_{450}$ blank well)/($OD_{450}$ control well−$OD_{450}$ blank well)])×100%

The fitted $IC_{50}$ values were calculated using the log (inhibitor) vs. response—Variable slop analysis method in GraphPad Prism software.
4) Results:

Material:

1) Agents: Compounds disclosed herein were formulated to a suitable concentration.
2) Animals: Kunming breed mice, weight 18-22 g, male. Provided by Jinan Pengyue Laboratory Animal Breeding Co., Ltd. Animal license number: SCXK (Shandong 20140007)

Method: Kunming breed mice, were randomly grouped by weight, 6 mice per group, namely normal control group, BFA high and low dose groups (1000 mg/kg and 750 mg/kg, respectively), and high and low dose groups of some compounds disclosed herein (BFA effective amount conversion). After a single intragastric administration, the animals were observed for behavior, mental status, feeding, drinking and other status responses and mortality. If the animals did not die, they were fed for 1 week, and the animals were weighed after 1 week, and the animals were executed to observe whether there were any abnormalities in the organs.

Results:

a) After high-dose administration of BFA, all animals died within 24 h; after low-dose administration, ⅔ of animals died within 72 h.

b) The animals were in good mental conditions after the administration of high and low doses of Compounds 1, 6 and 11 disclosed herein and there was no death within 72 h.

c) After 1 week, the weight of the animals in the administered group was slightly lower than that of the normal

TABLE 2

Effect of compounds disclosed herein on tumor cell proliferation

| Compound | $IC_{50}$ (μM) | | | | | | | |
|---|---|---|---|---|---|---|---|---|
| | HepG2 | Hela | Eca-109 | K562 | PANC-1 | MKN-45 | MCF7 | A549 |
| BFA | B | B | B | B | A | B | A | B |
| 1 | A | B | A | B | B | A | B | A |
| 2 | B | A | B | B | B | B | B | B |
| 3 | B | B | B | B | B | A | A | B |
| 4 | B | A | B | B | A | B | B | B |
| 5 | B | B | A | B | B | A | B | B |
| 6 | B | B | B | B | B | A | B | A |
| 7 | B | B | B | B | B | B | B | B |
| 8 | B | C | B | B | B | C | B | B |
| 9 | B | A | B | B | B | B | B | A |
| 10 | B | B | A | B | B | B | B | B |
| 11 | B | B | A | B | A | B | B | B |
| 12 | A | B | B | B | B | B | B | B |
| Compound A | B | C | B | B | C | C | C | B |
| Compound B | B | C | B | C | B | C | B | C |
| Compound C | B | C | C | B | B | C | B | B |
| Compound D | C | C | C | B | C | C | B | B |
| Adriamycin | D | B | B | C | A | B | C | B |

Note:
"A" represents an $IC_{50}$ value less than 0.1 μM;
"B" represents an $IC_{50}$ value in the range of 0.1-1.0 μM;
"C" represents an $IC_{50}$ value in the range of 1.0-10 μM and
"D" represents an $IC_{50}$ value higher than 10 μM.
In addition, compounds A, B, C and D disclosed herein were tested the effects on the proliferation of tumor cells in parallel.

In the screening of in vitro cellular assay, the compounds disclosed herein exhibited high cytotoxic activity against multiple cancer cell lines, somewhat better than or comparable to the positive drug adriamycin, slightly better than compounds A, B, C and D. Some of the compounds also exhibited good selectivity. Thus, the compounds disclosed herein have better potential application prospect in tumor proliferation inhibiting activity.

Test 2 Acute Toxicity Test

Objective: Observation of toxic effects of compounds after a single intragastric administration (ig.) to mice control group, but there was no significant difference by statistical comparison. There was no abnormality in anatomical observation.

The results showed that the compounds disclosed herein possessed a significant reduction in toxicity after administration to mice compared to BFA, exhibiting considerable effect of toxicity reduction.

Test 3 Pharmacokinetic Evaluation

1) Method

SD rats were weighed after an overnight fasting of 15 hours and randomly grouped according to weights. The appropriate amount of the compound was accurately weighed, and a final volume of 5% DMSO, 10% Solutol, and 85% Saline was added and vortexed or sonicated to make a thorough mixing to provide a 4 mg/mL solution for intravenous administration (iv.). Venous blood was taken at the time points of 0, 0.083 (iv. group only), 0.25, 0.5, 1.0, 2.0, 5.0, 7.0 and 24 h, via jugular vein or other suitable means, with approximately 0.20 mL of each sample collected, anticoagulated with sodium heparin (with 6.25 µL of 200 mM DDVP/tube added), and placed on ice after collection. The plasma was separated by centrifugation within 2 hours (centrifugal force 6800 g, 6 min, 2-8° C.). The collected plasma samples were stored in a −70° C. refrigerator before analysis, and the remaining plasma samples after analysis were kept stored at −20° C. or −70° C. until LC/MS/MS analysis was performed. The accuracy of QC samples was evaluated while analyzing the samples, and more than 66% of the QC samples were required to have an accuracy between 80-120%. When plasma drug concentration-time curves were plotted, BLQ were recorded as 0. For the calculation of pharmacokinetic parameters, the concentration before dosing was counted as 0; BLQ before $C_{max}$ (including "No peak") was counted as 0; BLQ after $C_{max}$ (including "No peak") was not included in the calculation. Pharmacokinetic parameters such as $AUC_{(0-t)}$, $T_{1/2}$, $C_{max}$, $T_{max}$ and MRT were calculated according to the blood concentration data of BFA at different time points using WinNonlin.

The Pharmacokinetic properties of compounds disclosed herein were tested by the above experiments.

2) Results

TABLE 3

Pharmacokinetic properties of the compounds disclosed herein

| Number | Drug delivery | Dosage (mg/kg) | $AUC_{INF}$ (h*ng/ml) | $AUC_{last}$ (h*ng/ml) | $C_{max}$ (ng/ml) | $MRT_{INF}$ (h) | $T_{1/2}$ (h) | $T_{max}$ (h) |
|---|---|---|---|---|---|---|---|---|
| BFA | iv | 20 | 4448.31 | 4450.24 | 5744.26 | 0.19 | 0.42 | 0.25 |
| Compound 1 | iv | 30 | 5763.29 | 5766.31 | 7192.20 | 0.19 | 0.25 | 0.25 |

Conclusion: Compared to BFA, the $C_{max}$ and AUC values of BFA released by the metabolism of the compounds disclosed herein in vivo are higher, that is, the compounds disclosed herein are metabolized in vivo to produce higher levels of BFA and greatly increase the levels of BFA in rats. It should be noted that Compound D disclosed herein was tested in parallel and it was found that at a dose of 40 mg/kg administration, low blood concentrations were detected within 1 h. After 1 h, the drug was basically undetectable and the pharmacokinetic parameter values could not be calculated. It can be seen that the in vivo metabolism of Compound 1 releases BFA more efficiently than that of compound D, which has an incomparable advantage.

In summary, the compounds disclosed herein have achieved outstanding progress of toxicity reduction and efficiency enhancement on the basis of BFA. On the other hand, the compounds disclosed herein have greatly improved the solubility and have further research value and broad development prospect.

Finally, it is important to note that there are other ways to implement the present disclosure. Accordingly, the embodiments disclosed herein are to be illustrated as examples, but are not limited to what is described in the present disclosure. It may be also an amendment made in the scope of this disclosure or an equivalent addition to the claims. All publications or patents cited herein will be used as references.

The invention claimed is:

1. A pharmaceutical composition, comprising a brefeldin A derivative, wherein the brefeldin A derivative is a compound represented by Formula (I)

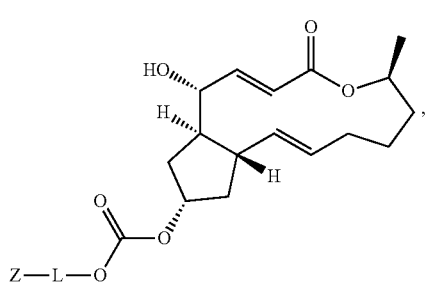

(I)

or a stereoisomer, a solvate, or a pharmaceutical acceptable salt of the compound
wherein Z is selected from the group consisting of optionally substituted pyridine ring, quinoline ring, and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, $C_{1-3}$ alkyl, $C_{1-3}$ haloalkyl, $C_{1-3}$ haloalkoxy, $C_{1-3}$ alkoxy, $C_{3-6}$ cycloalkyl, three to six-membered heterocyclyl, aryl and five to six-membered heteroaryl; and
L is a single bond or —$C_{1-6}$-alkylene.

2. The pharmaceutical composition according to claim 1, wherein Z is selected from the group consisting of optionally substituted pyridine ring, quinoline ring and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, methyl, ethyl, n-propyl, isopropyl, difluoromethyl, trifluoromethyl, methoxyl, trifluoromethoxy, ethyoxyl, isopropoxy, cyclopropyl, cyclobutyl, cyclopentyl, cyclohexyl, pyrrolidinyl, pyrazolyl, piperidyl, piperazinyl, tetrahydropyranyl, thiomorpholinyl, phenyl, morpholinyl, thiazolyl, oxazolyl, pyridyl and pyrimidinyl.

3. The pharmaceutical composition according to claim 1, wherein L is a single bond, methylene, ethylidene, propylidene or butylidene.

4. The pharmaceutical composition according to claim 1, wherein the compound represented by Formula (I) is selected from:

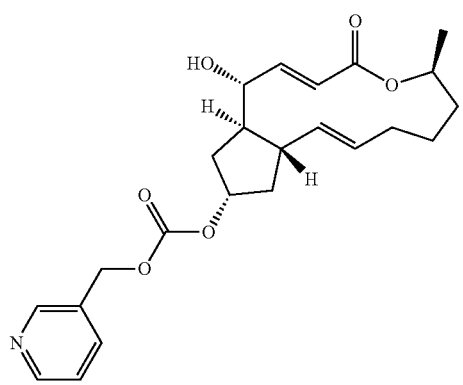

1

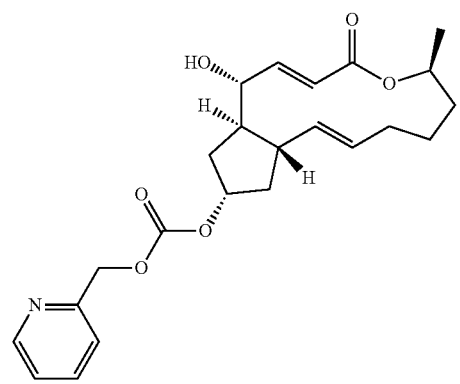

2

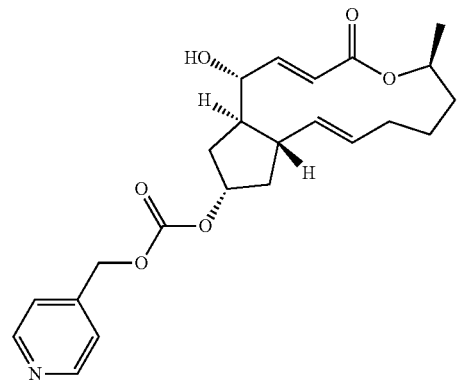

3

-continued
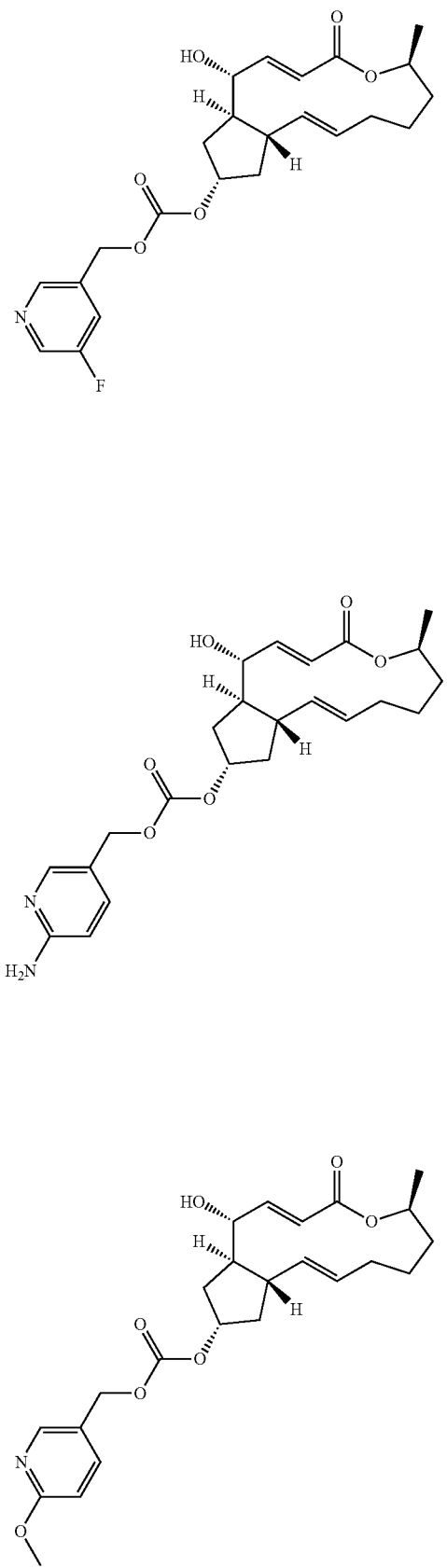
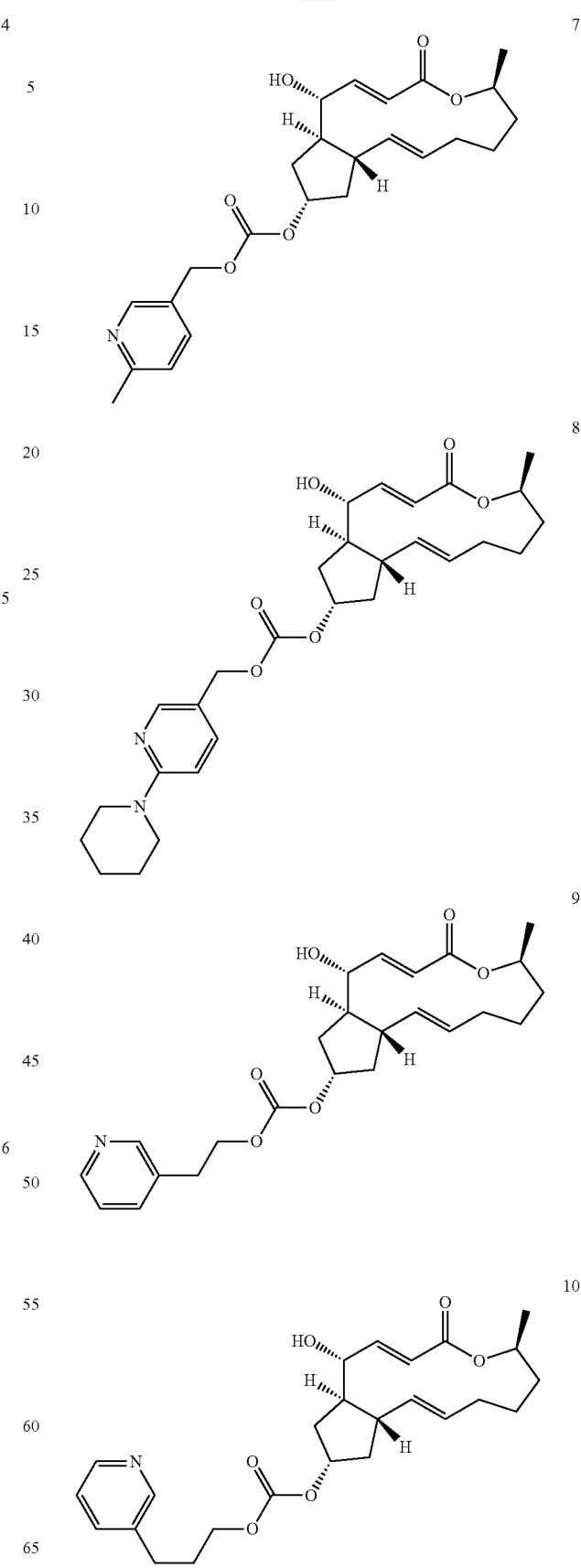

-continued

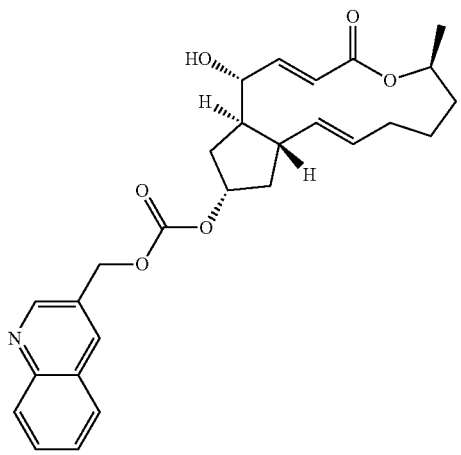

11

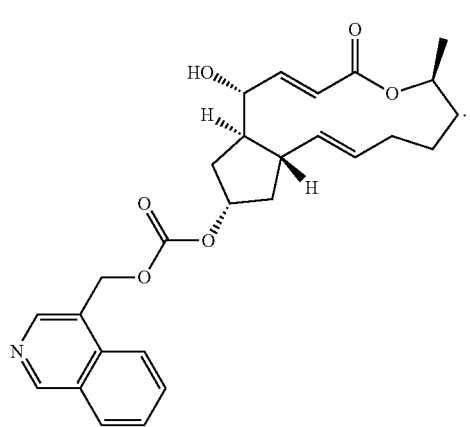

12

5. The pharmaceutical composition according to claim 1, wherein the stereoisomer of the compound represented by Formula (I) comprises a geometric isomer of the compound represented by Formula (I).

6. The pharmaceutical composition according to claim 1, wherein the solvate of the compound represented by Formula (I) comprises a hydrate of the compound represented by Formula (I).

7. The pharmaceutical composition according to claim 1, further comprising a pharmaceutically acceptable excipient, adjuvant, carrier, solvent or a combination thereof.

8. The pharmaceutical composition according to claim 7, wherein the excipient is selected from a diluent, a filler, a binder, disintegrant, a lubricant, a glidant, a granulating agent, a coating agent, a wetting agent, a solvent, a co-solvent, a suspending agent, a emulsifier, a sweetener, a corrigent, a taste masking agent, a colorant, an anti-caking agent, a humectant, a chelating agent, a plasticizer, a tackifier, an antioxidant, a preservative, a stabilizer, a surfactant or a buffer.

9. The pharmaceutical composition according to claim 7, wherein the carrier is selected from a disintegrant, a controlled-release polymer, a lubricant, a diluent or a colorant.

10. A method for treatment of a hyperproliferative disease in a mammal in need thereof, the method comprising administering an effective amount of the pharmaceutical composition of claim 1 to the mammal, wherein the hyperproliferative disease is selected from the group consisting of liver cancer, leukemia, breast cancer, colon adenocarcinoma, lung cancer, Bart's esophageal cancer, gastric cancer, cervical cancer, pancreatic cancer, kidney cancer, endometrial cancer, nasopharyngeal cancer, bone cancer, lymphoma, brain cancer, nerve cancer, oral cancer and colorectal cancer.

11. The method according to claim 10, wherein the mammal is a human mammals comprise humans.

12. The method according to claim 10, wherein Z is selected from the group consisting of optionally substituted pyridine ring, quinoline ring and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, methyl, ethyl, n-propyl, isopropyl, difluoromethyl, trifluoromethyl, methoxyl, trifluoromethoxy, ethyoxyl, isopropoxy, cyclopropyl, cyclobutyl, cyclopentyl, cyclohexyl, pyrrolidinyl, pyrazolyl, piperidyl, piperazinyl, tetrahydropyranyl, thiomorpholinyl, phenyl, morpholinyl, thiazolyl, oxazolyl, pyridyl and pyrimidinyl.

13. The method according to claim 10, wherein L is selected from single bond, methylene, ethylidene, propylidene or butylidene.

14. The method according to claim 10, wherein the compound of Formula (I) is selected from:

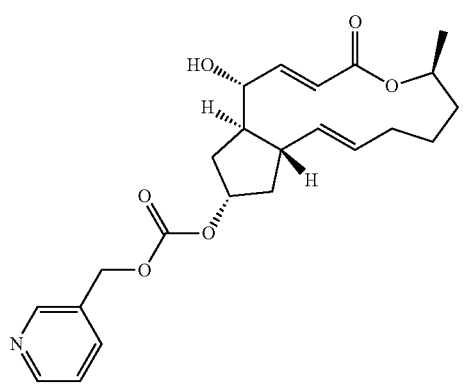

1

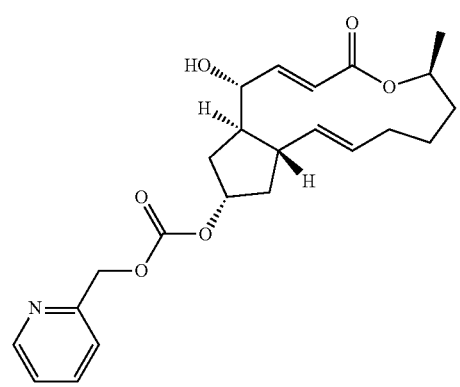

2

3
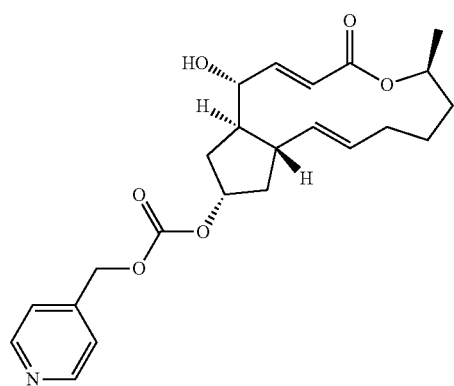
6
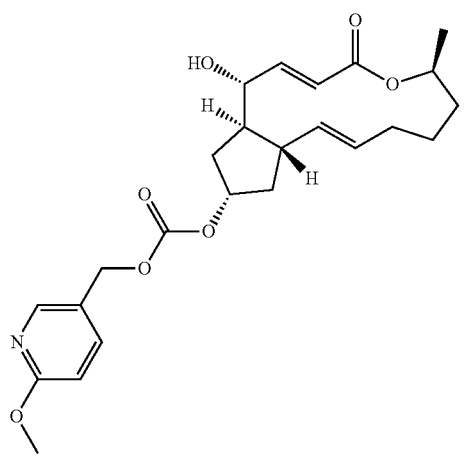
4
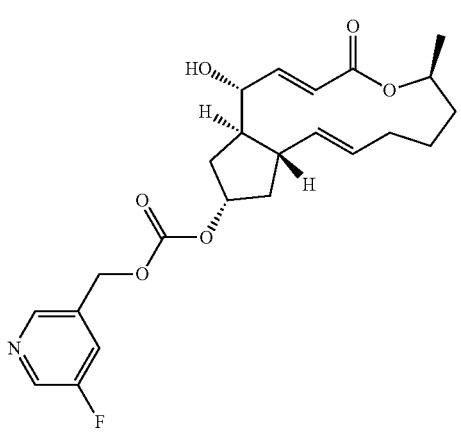
7
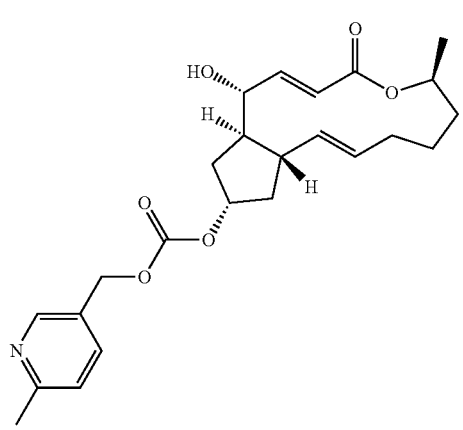
5
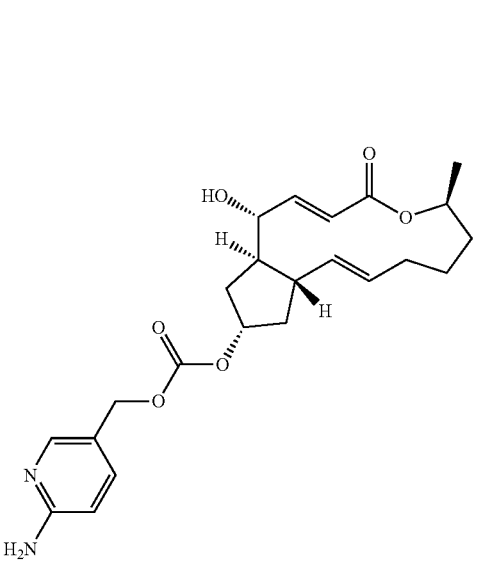
8
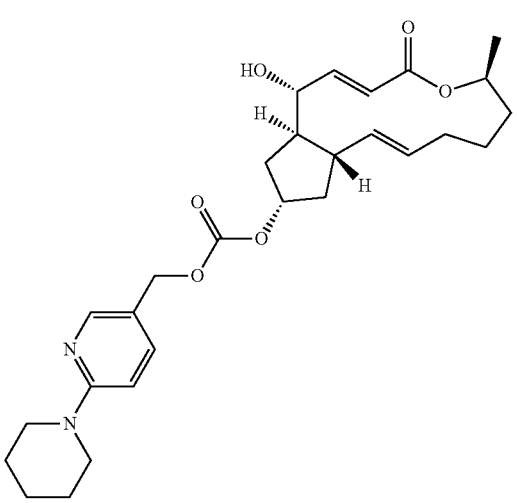

-continued

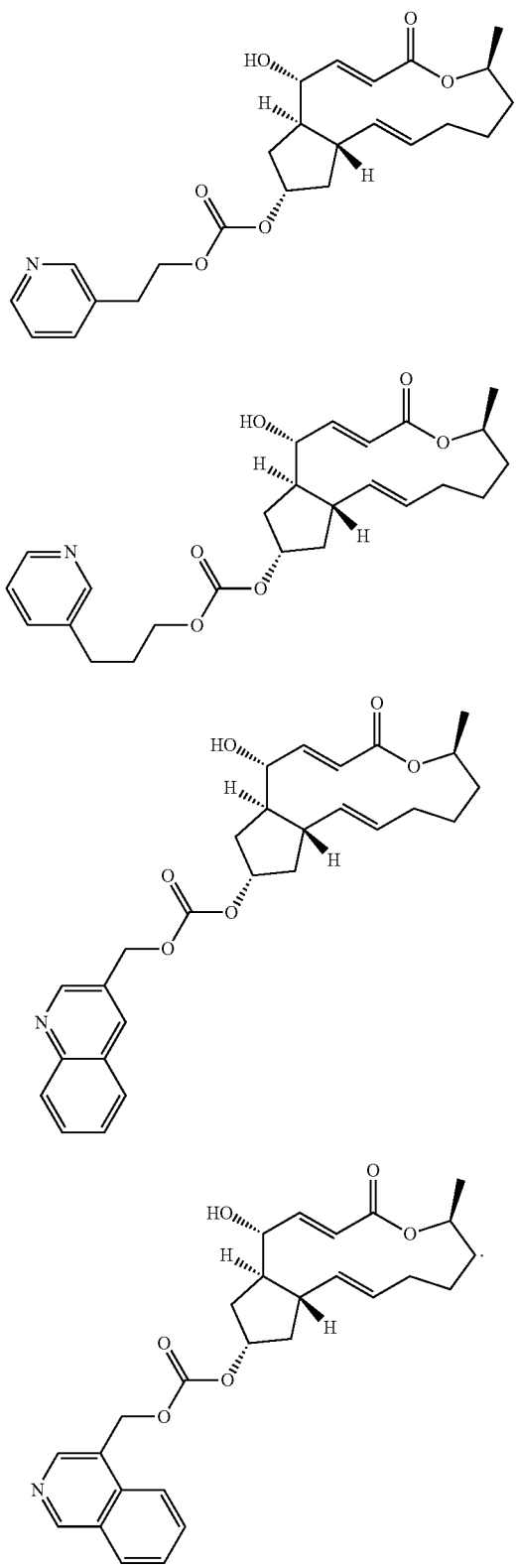

9

10

11

12

15. The method according to claim 10, wherein the stereoisomer of the compound represented by Formula (I) comprises a geometric isomer of the compound represented by Formula (I).

16. The method according to claim 10, wherein the solvate of the compound represented by Formula (I) comprises a hydrate of the compound represented by Formula (I).

17. A method for preparation of the compound represented by Formula (I),

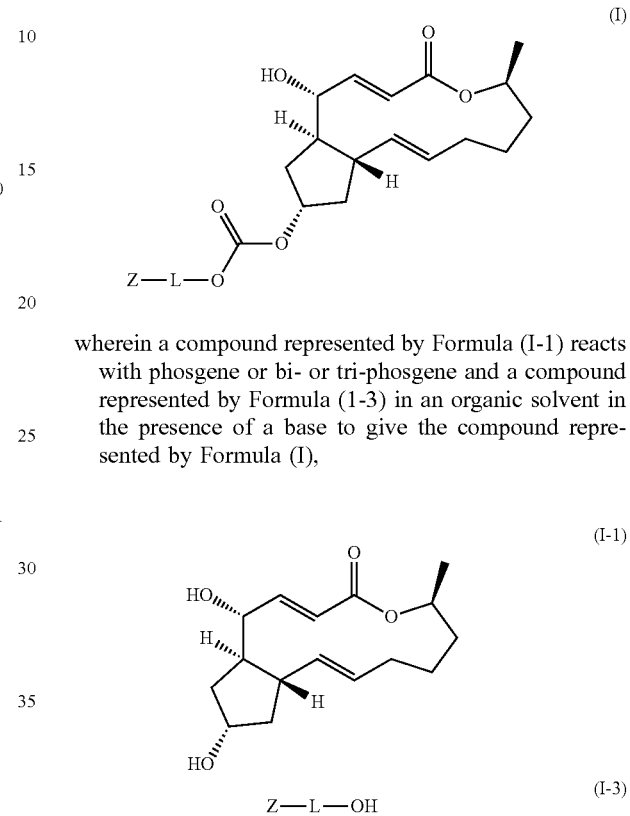

(I)

wherein a compound represented by Formula (I-1) reacts with phosgene or bi- or tri-phosgene and a compound represented by Formula (1-3) in an organic solvent in the presence of a base to give the compound represented by Formula (I), (I-1)

(I-3)

Z—L—OH wherein the solvent is acetone or tetrahydrofuran, and the base is selected from N,N-dimethyl-4-pyridine, triethylamine, pyridine, diisopropylethylamine or dimethylformamide;

wherein Z is selected from the group consisting of optionally substituted pyridine ring, quinoline ring, and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, $C_{1-3}$ alkyl, $C_{1-3}$ haloalkyl, $C_{1-3}$ haloalkoxy, $C_{1-3}$ alkoxy, $C_{3-6}$ cycloalkyl, three to six-membered heterocyclyl, aryl and five to six-membered heteroaryl;

and L is a single bond or —$C_{1-6}$-alkylene.

18. The method according to claim 17, wherein Z is selected from the group consisting of optionally substituted pyridine ring, quinoline ring and isoquinoline ring, wherein the pyridine ring, quinoline ring and isoquinoline ring are each independently and optionally substituted by 1, 2, 3, or 4 substituents selected from the group consisting of deuterium, fluorine, chlorine, bromine, iodine, hydroxyl, cyano, nitro, amino, methyl, ethyl, n-propyl, isopropyl, difluoromethyl, trifluoromethyl, methoxyl, trifluoromethoxy, ethyoxyl, isopropoxy, cyclopropyl, cyclobutyl, cyclopentyl, cyclohexyl, pyrrolidinyl, pyrazolyl, piperidyl, piperazinyl, tetrahydropyranyl, thiomorpholinyl, phenyl, morpholinyl, thiazolyl, oxazolyl, pyridyl and pyrimidinyl; and L is selected from single bond, methylene, ethylidene, propylidene or butylidene.

* * * * *

SEQUENCE LISTING

<160> NUMBER OF SEQ ID NOS: 2

<210> SEQ ID NO 1
<211> LENGTH: 22
<212> TYPE: DNA
<213> ORGANISM: Artificial Sequence
<220> FEATURE:
<223> OTHER INFORMATION: Synthetic

```
<400> SEQUENCE: 1
cttggtcatt tagaggaagt aa                                            22

<210> SEQ ID NO 2
<211> LENGTH: 20
<212> TYPE: DNA
<213> ORGANISM: Artificial Sequence
<220> FEATURE:
<223> OTHER INFORMATION: Synthetic

<400> SEQUENCE: 2
tcctccgctt attgatatgc                                               20
```